US010099191B1

(12) United States Patent
Lu et al.

(10) Patent No.: US 10,099,191 B1
(45) Date of Patent: Oct. 16, 2018

(54) METHOD OF MAKING COLLOIDAL METAL NANOPARTICLES

(71) Applicant: TRIPOD TECHNOLOGY CORPORATION, Taoyuan (TW)

(72) Inventors: Lin Lu, Taoyuan (TW); Kuei-Sheng Fan, Taoyuan (TW); Chen-Hsiang Wang, Taoyuan (TW); Chun-Lun Chiu, Taoyuan (TW); Ta-Wei Chang, Taoyuan (TW); Cheng-Ding Wang, Taoyuan (TW); Jim-Min Fang, Taoyuan (TW)

(73) Assignee: TRIPOD TECHNOLOGY CORPORATION, Taoyuan (TW)

( * ) Notice: Subject to any disclaimer, the term of this patent is extended or adjusted under 35 U.S.C. 154(b) by 8 days.

(21) Appl. No.: 15/630,838

(22) Filed: Jun. 22, 2017

(51) Int. Cl.
*B82Y 30/00* (2011.01)
*B01J 13/00* (2006.01)

(52) U.S. Cl.
CPC ....... *B01J 13/0043* (2013.01); *B01J 13/0039* (2013.01); *B82Y 30/00* (2013.01)

(58) Field of Classification Search
CPC ... B01L 13/0043; B01L 13/0039; B82Y 30/00
USPC .......................................................... 516/97
See application file for complete search history.

(56) References Cited

U.S. PATENT DOCUMENTS

| 8,048,193 | B2 | 11/2011 | Taniuchi et al. |
| 2007/0190323 | A1 | 8/2007 | Lee et al. |
| 2007/0219083 | A1* | 9/2007 | Zhang ............... B01J 13/0034 502/150 |
| 2012/0046482 | A1 | 2/2012 | Guo et al. |

FOREIGN PATENT DOCUMENTS

CN 102699343 A 10/2012

OTHER PUBLICATIONS

Dumur et al. "Controlled spontaneous generation of gold nanoparticles assisted by dual reducing and capping agents", Gold Bull (2011) 44:119-137.*
Wang L. et al. Reducing agents and capping agents in the preparation of metal nanoparticles. Apr. 2010, Progress in Chemistry (vol. 22, No. 4).
Dumur, F. et al. Controlled spontaneous generation of gold nanoparticles assisted by dual reducing and capping agents. Jun. 2011, Gold Bull (2011) 44:119-137.
Saha, K. et al. Gold nanoparticles in chemical and biological sensing. Feb. 2012, Chemical Reviews (vol. 112, 2739-2779).

(Continued)

*Primary Examiner* — William K Cheung
(74) *Attorney, Agent, or Firm* — Ming Chow; Sinorica, LLC

(57) ABSTRACT

Provided is a method of making colloidal metal nanoparticles. The method includes the steps of: mixing a metal aqueous solution and a reducing agent to form a mixture solution in a reaction tank; heating the mixture solution and undergoing a reduction reaction to produce a composition containing metal nanoparticles, residues and gas, wherein the amount of the residues is less than 20% by volume of the mixture solution, and guiding the gas out of the reaction tank; dispersing the metal nanoparticles with a medium to obtain colloidal metal nanoparticles. By separating the reduction reaction step and the dispersion step, the method of making colloidal metal nanoparticles is simple, safe, time-effective, cost-effective, and has the advantage of high yield.

26 Claims, 36 Drawing Sheets

(56) References Cited

OTHER PUBLICATIONS

Hutter, E. et al. Gold-nanoparticle-based biosensors for detection of enzyme activity. Sep. 2013, Trends in Pharmacological Sciences, vol. 34, No. 9.
Bao, G. et al. Mulifunctional nanoparticles for drug delivery and molecular imaging. Apr. 2013, Annu. Rev. Biomed. Eng. 2013. 15:253-82.
Patil, M. P. et al. Eco-friendly approach for nanoparticles synthesis and mechanism behind antibacterial activity of silver and anticancer activity of gold nanoparticles. Dec. 2016, Appl. Microbiol. Biotechnol. (2017) 101:79-92
Chen, Y. et al. Surface modification of gold nanoparticles with small molecules for biochemical analysis. Jan. 2017, Acc. Chem. Res. (vol. 50, pp. 310-319).

\* cited by examiner

METHOD OF MAKING COLLOIDAL METAL NANOPARTICLES

BACKGROUND OF THE INVENTION

1. Field of the Invention

The present disclosure relates to a method of making colloidal metal nanoparticles.

2. Description of the Prior Arts

Colloidal metal nanoparticles exhibit the optical, electromagnetic and chemical properties distinct from those of bulk materials because of their small size effect, surface effect, and quantum size effect. Therefore, metal nanoparticles have a wide range of applications in materials science, information science, catalysis and life sciences. In recent years, scientists have been actively developing various methods to produce metal nanoparticles. The methods for making metal nanoparticles can be divided into three major categories: (1) laser ablation method, which uses high-energy laser for continuous irradiation on a metal bulk material; (2) metal vapor synthesis, which condense vaporized gaseous metal atoms under controlled conditions for aggregation; and (3) chemical reduction method, which reduces metal ions to metal nanoparticles in solutions. At present, the chemical reduction method is most commonly and conveniently utilized in preparation of metal nanoparticles. The reduction reactions can be performed in water or organic solvents.

Having large surface area, metal nanoparticles display high physical and chemical activities for easy oxidation and agglomeration. Thus, a variety of modifiers or capping agents are often introduced in the chemical preparation of metal nanoparticles for control of the particle size, shape, distribution, dispersion and stability. The technology for making metal nanoparticle colloids has a great influence on the stability and quality of the product. However, adding those stabilizers make the producing method more complicated.

To overcome the problem, some methods have been provided.

U.S. Pat. No. 8,048,193 discloses a method for producing gold colloid. The method includes a nucleation step of forming nuclear colloidal particles by adding a citrate reducing agent to a first gold salt solution; and a growth step of growing nuclear colloid, which is necessarily performed at least once, by adding a second gold salt and an ascorbate reducing agent to the solution of the nuclear colloidal particles. Although said method could produce gold colloids having a targeted particle size and a uniform spherical shape, the method could not be performed as desired unless using the particular reagents and restricted steps. In order to obtain larger particle size of gold colloids, the number of the growth step should be increased. As a result, said method in the prior art still is not performed conveniently and efficiently.

US 20120046482 discloses a method for synthesizing gold nanoparticles. A gold ion containing solution and a carboxylic acid including at least two carboxyl groups are mixed to form a mixture and reacted at a reaction temperature of about 20° C. to about 60° C. Although said method could produce gold nanoparticles simply, the method could not be performed as desired unless using the particular reagents. Said method limits the reacting step at a relatively low reaction temperature, so said reacting step needs more time to complete, and some reduction agents could not be applied in this method. As a result, said method in the prior art still is not performed conveniently and efficiently.

SUMMARY OF THE INVENTION

In view that the conventional methods fail to produce colloidal metal nanoparticles conveniently and efficiently, an objective of the instant disclosure is to simplify the method and the system for making colloidal metal nanoparticles and thereby obtain the high yield product in a simple, safe, time-effective, cost-effective, and environment-friendly way.

To achieve the foresaid objectives, the instant disclosure provides a method of making colloidal metal nanoparticles including steps (a) to (c). In step (a), a metal aqueous solution is mixed with a reducing agent to form a mixture solution in a reaction tank. In step (b), the mixture solution is heated and undergoes a reduction reaction to produce a composition containing metal nanoparticles, residues and gas, wherein the amount of the residues less than 20% by volume of the mixture solution, and guiding said gas out of the reaction tank. In step (c), the metal nanoparticles are dispersed with a medium to obtain colloidal metal nanoparticles.

By means of heating the mixture solution and guiding the gas produced from the reduction reaction out of the reaction tank, the reduction reaction can react completely, and then the yield can be improved. Also, limiting the volume of the mixture solution in the reduction reaction can enhance collision probability of reactant atoms, so that the reaction rate can accelerate. As water medium is vaporized during formation of metal nanoparticles, the reduction reaction step and the dispersion step will not proceed at the same time. Moreover, the reducing agents and dispersing agents have a wide range of choices and will not be restricted. Accordingly, the present method is useful to simplify the production of colloidal metal nanoparticles.

In accordance with the instant disclosure, the metal aqueous solution contains metal ions, and the metal ions comprise gold ions, silver ions, copper ions, zinc ions, nickel ions, palladium ions, cobalt ions, iron ions, titanium ions, cadmium ions, platinum ions, aluminum ions, lead ions, manganese ions, chromium ions, molybdenum ions, vanadium ions, or tungsten ions.

In accordance with the instant disclosure, the metal aqueous solution also contains anions, and the anions comprise halide ions, hydroxide ions, acetate ions, nitrate ions, sulfate ions, or phosphate ions.

In some cases, the metal ions are from $HAuCl_4$, $AgNO_3$, $Cu(NO_3)_2$, $CuCl_2$, $ZnCl_2$, $NiCl_2$, $PdCl_2$, $CoCl_2$, $FeCl_2$, $FeCl_3$, $TiCl_2$, or $TiCl_4$.

In addition, trapping the gas produced from the reduction reaction with water can collect a large amount of aqueous acids to be recovered for reuse, which can reduce the acid wastes.

In certain embodiments, $HAuCl_4$ is used for making gold nanoparticles, and the gaseous HCl generated from the reduction reaction is trapped with water to make hydrochloric acid for recovery.

In certain embodiments, $AgNO_3$ is used for making silver nanoparticles, and the gaseous $NO_2$ generated from the reduction reaction is trapped with water to make nitric acid for recovery.

The reaction temperature affects the reaction rate of making metal nanoparticles. Without proper temperature control, the reaction will proceed unevenly and may generate bubble to affect the quality of metal nanoparticles.

In accordance with the instant disclosure, the temperature of the heating in the step (b) ranges from 50° C. to 150° C. Preferably, the temperature of the heating in the step (b) ranges from 70° C. to 130° C.

In accordance with the instant disclosure, the temperature of the dispersing in the step (c) ranges from 20° C. to 100° C. Preferably, the temperature of the dispersing in the step (c) ranges from 50° C. to 80° C.

In accordance with the instant disclosure, the reducing agent may comprise at least one ester.

In some cases, said ester is selected from the group of a carboxylate ester, a cyclic ester, a polymeric ester, and combinations thereof.

Preferably, said carboxylate ester is represented by the formula (I),

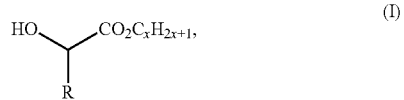

wherein R is H or CH$_3$, and x is an integer ranging from 1 to 16.

Preferably, said cyclic ester is represented by the formula (II),

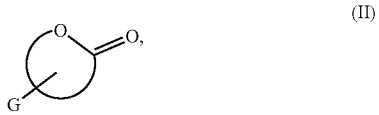

wherein the ring contains one oxygen atom and 4 to 6 carbon atoms, and G is H, CH$_3$ or C$_2$H$_5$.

Preferably, said polymeric ester is represented by the formula (III),

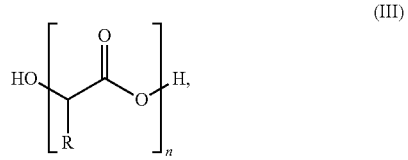

wherein R is H or CH$_3$, and n is an integer ranging from 2 to 1400.

Preferably, said combination of ester reducing agents is a methyl lactate and an ethyl lactate, a methyl lactate and γ-butyrolactone, or a ethyl lactate and γ-butyrolactone.

In accordance with the instant disclosure, the reducing agent may comprise a citric acid, a lactic acid, a glycolic acid, an ascorbic acid, an oxalic acid, a tartaric acid, a 1,4-butanediol, a glycerol, a poly(ethylene glycol), a hydroquinone, an acetaldehyde, a glucose, a cellulose, a carboxymethyl cellulose, a cyclodextrin, a chitin, a chitosan, or combinations thereof.

In some cases, the reducing agent may comprise a combination of at least one ester and at least one non-ester reducing agent.

Preferably, said combination of at least one ester and at least one non-ester reducing agent is a methyl lactate in combination with a lactic acid, a citric acid, 1,4-butanediol, or a poly(ethylene glycol).

Preferably, said combination of at least one ester and at least one non-ester reducing agent is an ethyl lactate in combination with a lactic acid, a citric acid, 1,4-butanediol, or a poly(ethylene glycol).

Preferably, said combination of at least one ester and at least one non-ester reducing agent is a γ-butyrolactone in combination with a lactic acid.

In some cases, the molar concentration of the metal aqueous solution ranges from 0.1 M to 3.0 M. Preferably, the molar concentration of the metal aqueous solution ranges from 0.1 M to 1.0 M. More preferably, the molar concentration of the metal aqueous solution is 0.2 M.

In some cases, when the reducing agent is selected from the group of a carboxylate ester, a cyclic ester, a citric acid, a lactic acid, a glycolic acid, an ascorbic acid, an oxalic acid, a tartaric acid, a 1,4-butanediol, a glycerol, a hydroquinone, an acetaldehyde, a glucose, a chitin, and combinations thereof, a molar ratio of the reducing agent relative to the metal ions ranges from 1 to 40. Preferably, the molar ratio of the reducing agent relative to the metal ions ranges from 1 to 8. More preferably, the molar ratio of the reducing agent relative to the metal ions is 4.

In some cases, the ester is a polymeric ester, and the weight of said polymeric ester ranges from 30 mg to 150 mg.

In accordance with the instant disclosure, the reaction time ranges from 5 minutes to 80 minutes depending on the kind of the reducing agent and the molar concentration of reactants. Preferably, the reaction time ranges from 7 minutes to 15 minutes.

The reduction rate of gold ion can be tuned by a combined use of reducing agents to give gold nanoparticles in various sizes.

In accordance with the instant disclosure, the medium in step (c) for dispersing the metal nanoparticles may be water or an aqueous solution of dispersing agent.

In some cases, said aqueous solution of dispersing agents may be an aqueous citric acid, an aqueous lactic acid, an aqueous poly(lactic acid), an aqueous sodium hydroxide, an aqueous hexadecylamine, an aqueous oleylamine, an aqueous tetraoctylammonium bromide (TOAB), an aqueous dodecanethiol, an aqueous poly(ethylene oxide), an aqueous polyvinylpyrrolidone (PVP), or combinations thereof.

The molar concentration of the dispersing agents ranges from 0.001 M to 0.1 M.

Preferably, the molar concentration of the dispersing agents ranges from 0.01 M to 0.05 M.

In some cases, the molar ratio of the dispersing agent to metal nanoparticles ranges from 10 to 100.

Preferably, the molar ratio of the dispersing agent to metal nanoparticles ranges from 15 to 30.

In accordance with the instant disclosure, all the water used in the aqueous solution is a distilled water. More preferably, the water is a deionized water.

It is beneficial to use only organic reducing agents and organic dispersing agents in water without the involvement of inorganic cations such as Na$^+$ or K$^+$ to process the reduction reaction in step (b) and dispersing in step (c). Accordingly, said colloidal metal nanoparticles will attain a good stability without the interference of inorganic cations.

In accordance with the instant disclosure, the process of the reduction reaction is monitored by the infrared (IR) spectral analysis on-site.

The region from about 1500 cm$^{-1}$ to 500 cm$^{-1}$ of the IR spectrum contains a very complicated series of absorptions. These are mainly due to all manners of bond vibrations within the molecule. This region is called the fingerprint region. The importance of the fingerprint region is that each different substance produces a different pattern of troughs in this part of the spectrum. Therefore, the pattern of troughs different from the original mixture solution means the reaction proceeds, and when the pattern of troughs is not changed apparently, the reaction is complete.

In accordance with the instant disclosure, the size of colloidal metal nanoparticles may be characterized by the ultraviolet-visible (UV-Vis) spectral absorption because the wavelength at absorption maximum ($\lambda$max) of the colloidal metal nanoparticles in UV-Vis spectrum has its own specific range.

In some cases, the $\lambda$max of colloidal gold nanoparticles ranges from 515 nm to 572 nm.

In some cases, the $\lambda$max of colloidal silver nanoparticles ranges from 370 nm to 420 nm.

Besides the kinds of the metal, the size of colloidal metal nanoparticles also affects the $\lambda$max in UV-Vis spectrum. An increase in wavelength $\lambda$max correlates to an increase in the size of the nanoparticle. For example, the colloidal gold nanoparticles with $\lambda$max at 525 nm correspond to their average size of 26 nm±1 nm; the colloidal gold nanoparticles with $\lambda$max at 530 nm correspond to their average size of 30 nm±1 nm.

In accordance with the instant disclosure, the size of metal nanoparticles also can be characterized by transmission electron microscopy (TEM) imaging.

In accordance with the instant disclosure, the colloidal metal nanoparticles show high zeta potential, which is a key indicator of the stability of colloidal dispersion.

Other objectives, advantages and novel features of the disclosure will become more apparent from the following detailed description when taken in conjunction with the accompanying drawings.

DETAILED DESCRIPTION OF THE PREFERRED EMBODIMENTS

Hereinafter, one skilled in the arts can easily realize the advantages and effects of the instant disclosure from the following examples. Therefore, it should be understood that the descriptions proposed herein are just preferable examples for the purpose of illustrations only, not intended to limit the scope of the disclosure. Various modifications and variations could be made in order to practice or apply the instant disclosure without departing from the spirit and scope of the disclosure.

Process of Making Colloidal Metal Nanoparticles

In the following examples, infrared (IR) spectra were recorded on Agilent Technologies Cary630 Fourier transform (FT)-IR spectrometer. Ultraviolet-visible (UV-Vis) spectra were measured on Agilent Technologies Cary60 UV-Vis spectrophotometer. Transmission electron microscopy (TEM) images were recorded on Hitachi H-7100 microscope. All the reagents were reagent grade and used as purchase without further purification. Tetrachloroauric acid ($HAuCl_4$, 0.2 M aqueous solution) and zinc powder were purchased from Acros Organics (New Jersey, USA). Silver nitrate ($AgNO_3$, 0.1 M aqueous solution) was purchased from Merck & Co. (New Jersey, USA). Palladium chloride ($PdCl_2$, containing 59.4% Pd) was purchased from Uni Region Bio-Tech (Taipei, Taiwan). Ultra-pure water was purchased from Hao Feng Biotech Co. (Taipei, Taiwan).

Figure 1:
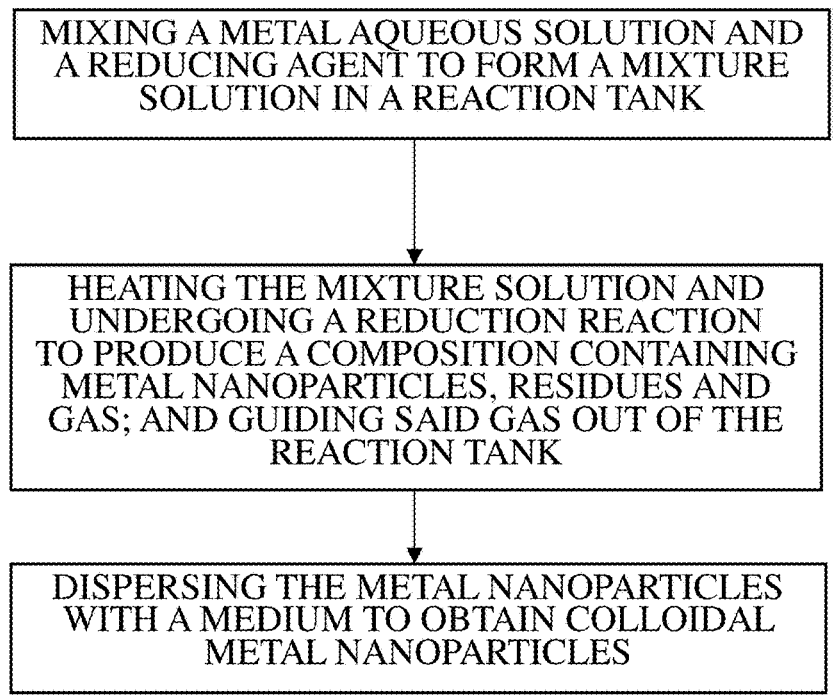
FIG. 1 is a schematic flow diagram illustrating a method for making colloidal metal nanoparticles in accordance with the present invention.

Example 1 Synthesis of Colloidal Gold Nanoparticles Using Methyl Lactate as Reducing and Dispersing Agent Hereinafter, the process of making colloidal metal nanoparticles was conducted by using the method as shown in FIG. 1.

First, in step (a), Tetrachloroauric acid (0.25 mL of 0.2 M aqueous solution, 0.05 mmol) and methyl lactate (22.3 mg, 0.21 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of methyl lactate (200 mg, 1.9 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda max=550$ nm with OD=0.365.

Example 2 Synthesis of Colloidal Gold Nanoparticles Using Methyl Lactate as Reducing Agent and Citric Acid as Dispersing Agent First, in step (a), Tetrachloroauric acid (0.25 mL of 0.2 M aqueous solution, 0.05 mmol) and methyl lactate (20.6 mg, 0.20 mmol) were added via an inlet port into a double-necked flat-bottomed 100 mL reaction flask and were mixed to form a mixture solution.

Figure 2:
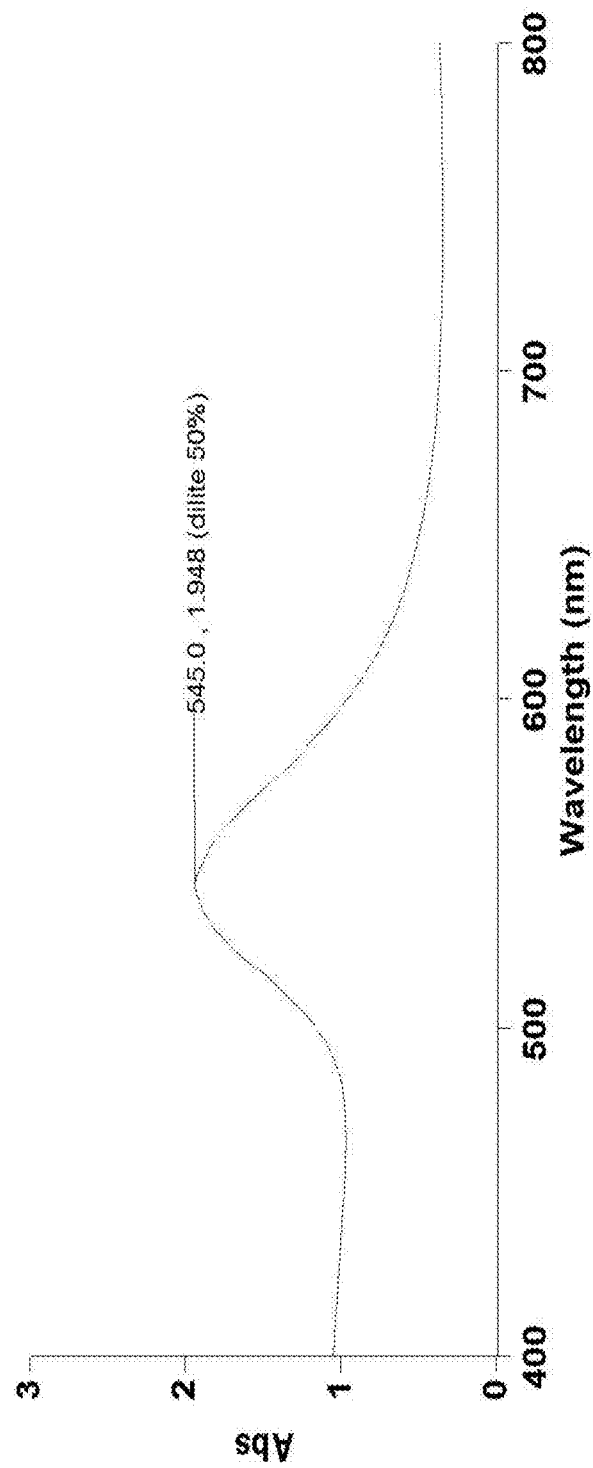
FIG. 2 is a UV-Vis spectrum of colloidal gold nanoparticles obtained in Example 2.
Figure 3A:
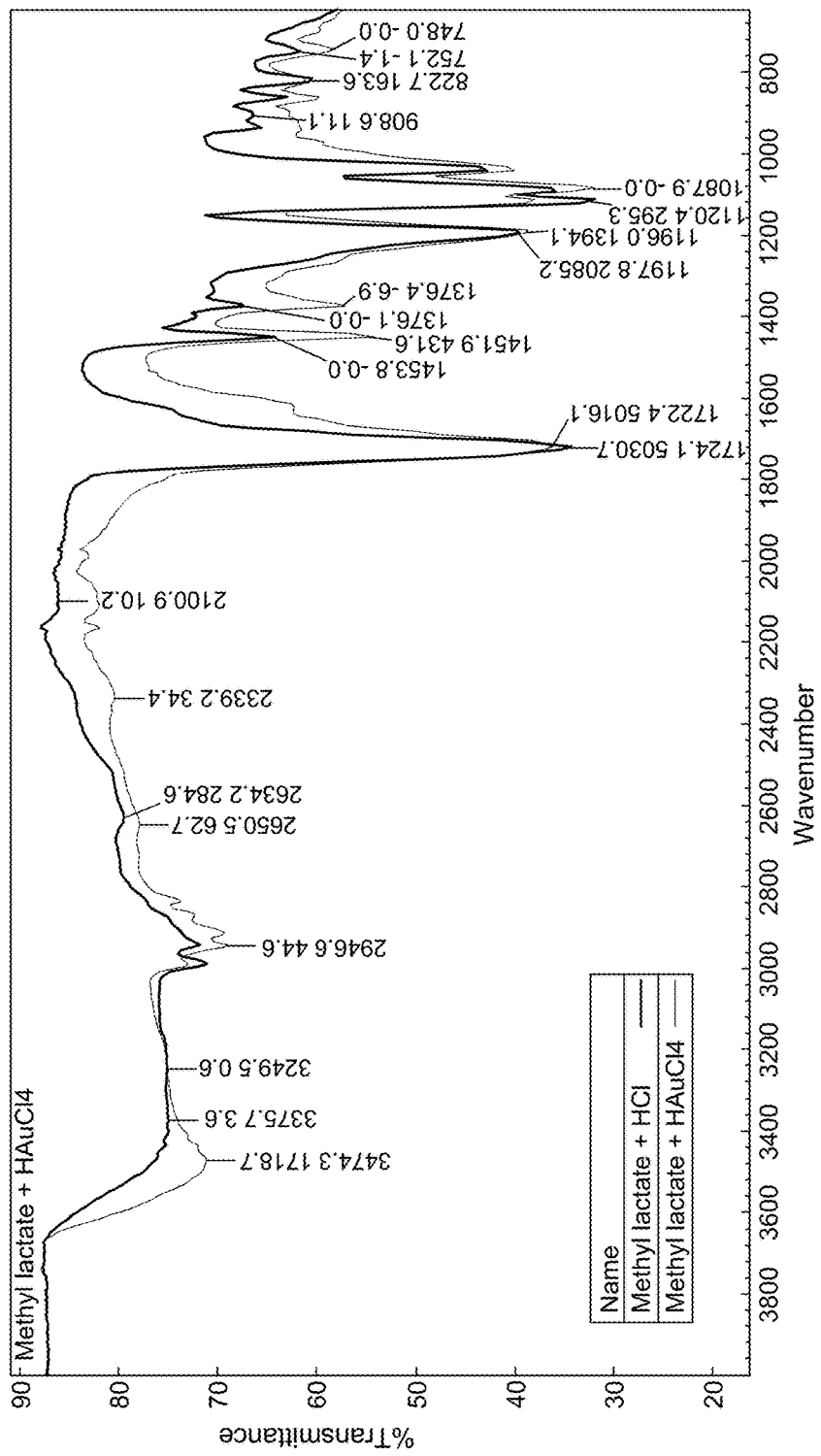
FIG. 3A is a FT-IR spectra of colloidal gold nanoparticles obtained in Example 2 (as shown in thin line) and product of heating methyl lactate with aqueous HCl at 130° C. for 12 minutes (as shown in thick line)
Figure 3B:
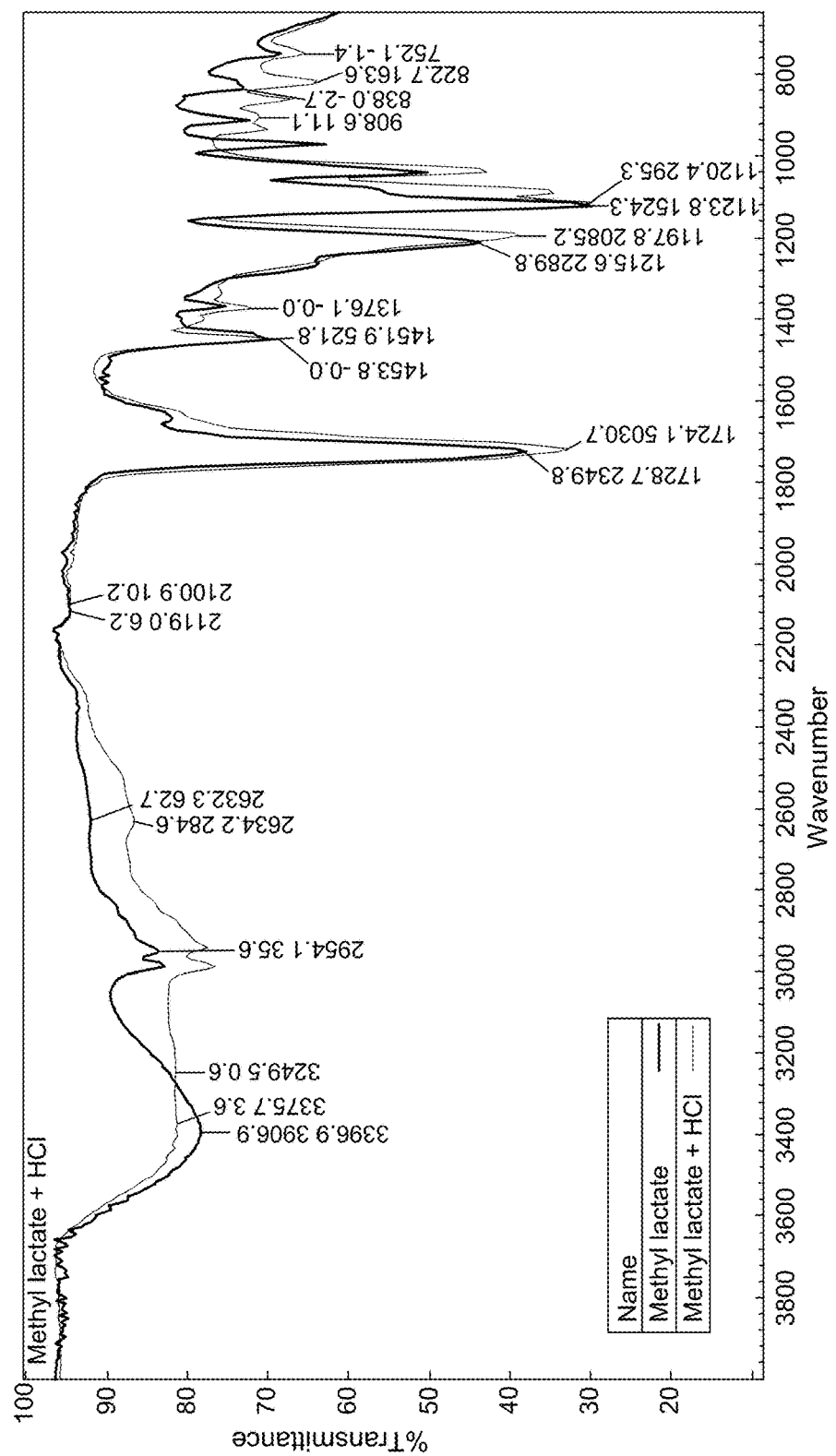
FIG. 3B is a FT-IR spectra of product of heating methyl lactate with aqueous HCl at 130° C. for 12 minutes (as shown in thin line) and starting material of methyl lactate (as shown in thick line)

Subsequently, in step (b), the flat-bottomed flask was placed on a hot plate and heated at 130° C. for 15 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda max=545$ nm with OD=3.896 as in FIG. 2, (measured at 50% dilution). In addition, formation of colloidal gold nanoparticles was confirmed by the FT-IR spectrum as shown in FIG. 3A.

Example 3 Synthesis of Colloidal Gold Nanoparticles Using Methyl Lactate as Reducing Agent and Citric Acid as Dispersing Agent without Heating First, in step (a), Tetrachloroauric acid (0.25 mL of 0.2 M aqueous solution, 0.05 mmol) and methyl lactate (20.8 mg, 0.20 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was stirred at room temperature for 10 minutes to obtain colloidal gold nanoparticles, which showed the UV-Vis absorption band at $\lambda max=545$ nm with OD=1.784.

Example 4 Synthesis of Colloidal Gold Nanoparticles Using Methyl Lactate and 1,4-Butanediol as Combined Reducing Agent First, in step (a), Tetrachloroauric acid (0.25 mL of 0.2 M aqueous solution, 0.05 mmol) and methyl lactate (10.7 mg, 0.10 mmol) and 1,4-butanediol (10.2 mg, 0.11 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 10.5 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=530 nm with OD=1.258.

Example 5 Synthesis of Colloidal Gold Nanoparticles Using Methyl Lactate and Citric Acid as Combined Reducing Agent First, in step (a), Tetrachloroauric acid (0.25 mL of 0.2 M aqueous solution, 0.05 mmol) and methyl lactate (14.7 mg, 0.14 mmol) and citric acid (20.9 mg, 0.11 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 10.5 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 4:
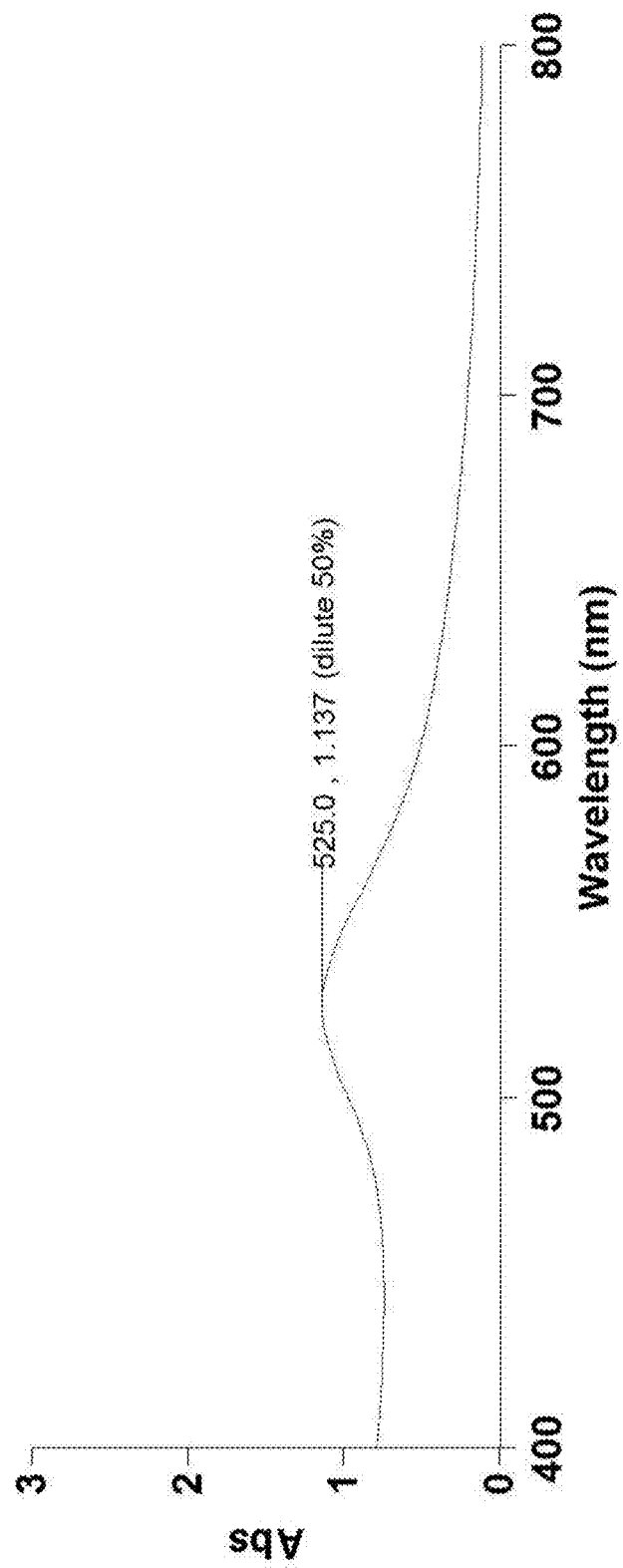
FIG. 4 is a UV-Vis spectrum of colloidal gold nanoparticles obtained in Example 5.
Figure 5:
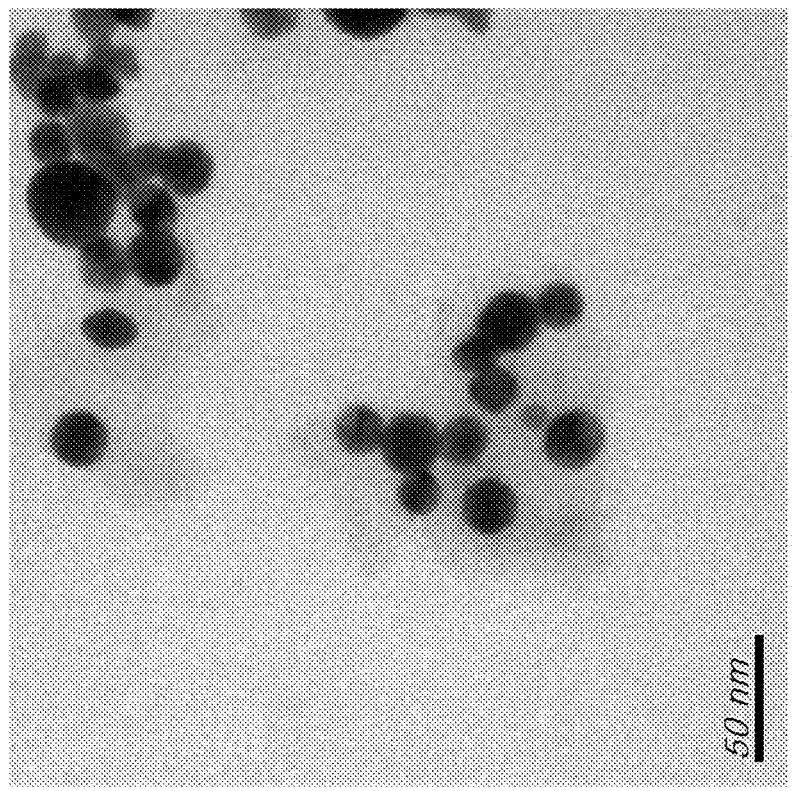
FIG. 5 is TEM image of gold nanoparticles (mean diameter of 22 nm-23 nm) obtained in Example 5.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=2.274 as in FIG. 4, (measured at 50% dilution). The mean diameter of gold nanoparticles was 22 nm to 23 nm as shown by TEM image in FIG. 5.

Example 6 Synthesis of Colloidal Gold Nanoparticles Using Methyl Lactate and PEG800 as Combined Reducing Agent First, in step (a), Tetrachloroauric acid (0.25 mL of 0.2 M aqueous solution, 0.05 mmol) and methyl lactate (12.1 mg, 0.12 mmol) and PEG800 (80.4 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 15.5 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=3.172.

Example 7 Synthesis of Colloidal Gold Nanoparticles Using Methyl Lactate and PEG1000 as Combined Reducing Agent First, in step (a), Tetrachloroauric acid (0.25 mL of 0.2 M aqueous solution, 0.05 mmol) and methyl lactate (11.2 mg, 0.12 mmol) and PEG1000 (106.3 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 15.5 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=3.118.

Example 8 Synthesis of Colloidal Gold Nanoparticles Using Methyl Lactate and PEG4000 as Combined Reducing Agent First, in step (a), Tetrachloroauric acid (0.25 mL of 0.2 M aqueous solution, 0.05 mmol) and methyl lactate (12.1 mg, 0.12 mmol) and PEG4000 (402.7 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=530 nm with OD=3.412.

Example 9 Synthesis of Colloidal Gold Nanoparticles Using Methyl Lactate and PEG8000 as Combined Reducing Agent First, in step (a), Tetrachloroauric acid (0.25 mL of 0.2 M aqueous solution, 0.05 mmol) and methyl lactate (11.6 mg, 0.11 mmol) and PEG8000 (808.2 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=535 nm with OD=2.952.

Example 10 Synthesis of Colloidal Gold Nanoparticles Using Methyl Lactate and PEG10000 as Combined Reducing Agent First, in step (a), Tetrachloroauric acid (0.25 mL of 0.2 M aqueous solution, 0.05 mmol) and methyl lactate (11 mg, 0.11 mmol) and PEG10000 (1.003 g) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=530 nm with OD=3.028.

Example 11 Synthesis of Colloidal Gold Nanoparticles Using Methyl Lactate and PEG11000 as Combined Reducing Agent First, in step (a), Tetrachloroauric acid (0.25 mL of 0.2 M aqueous solution, 0.05 mmol) and methyl lactate (11.9 mg, 0.11 mmol) and PEG11000 (1.104 g) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=535 nm with OD=3.548.

Example 12 Synthesis of Colloidal Gold Nanoparticles Using Methyl Lactate and Lactic Acid as Combined Reducing Agent First, in step (a), Tetrachloroauric acid (0.25 mL of 0.2 M aqueous solution, 0.05 mmol) and methyl lactate (11.8 mg, 0.11 mmol) and lactic acid (13.1 mg, 0.15 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 15 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=530 nm with OD=3.49.

Example 13 Synthesis of Colloidal Gold Nanoparticles Using Methyl Lactate and Ethyl Lactate as Combined Reducing Agent First, in step (a), Tetrachloroauric acid (0.25 mL of 0.2 M aqueous solution, 0.05 mmol) and methyl lactate (10.4 mg, 0.10 mmol) and ethyl lactate (13.1 mg, 0.11 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 8.5 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=530 nm with OD=1.844.

Example 14 Synthesis of Colloidal Gold Nanoparticles Using Ethyl Lactate as Reducing and Dispersing Agent First, in step (a), Tetrachloroauric acid (0.25 mL of 0.2 M aqueous solution, 0.05 mmol) and ethyl lactate (26.7 mg, 0.23 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of ethyl lactate (200 mg, 1.7 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=555 nm with OD=0.397.

Example 15 Synthesis of Colloidal Gold Nanoparticles Using Ethyl Lactate as Reducing Agent and Citric Acid as Dispersing Agent First, in step (a), Tetrachloroauric acid (0.25 mL of 0.2 M aqueous solution, 0.05 mmol) and ethyl lactate (25.9 mg, 0.22 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 10 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 6:
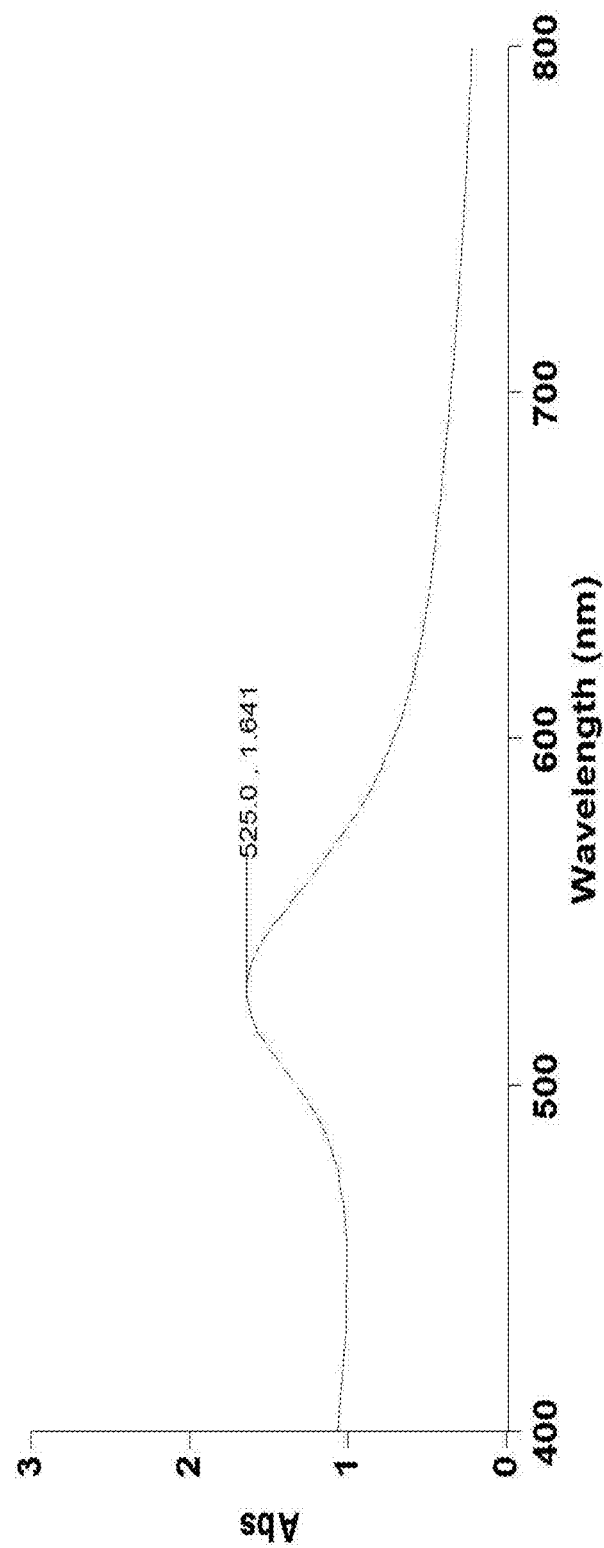
FIG. 6 is a UV-Vis spectrum of colloidal gold nanoparticles obtained in Example 15.
Figure 7A:
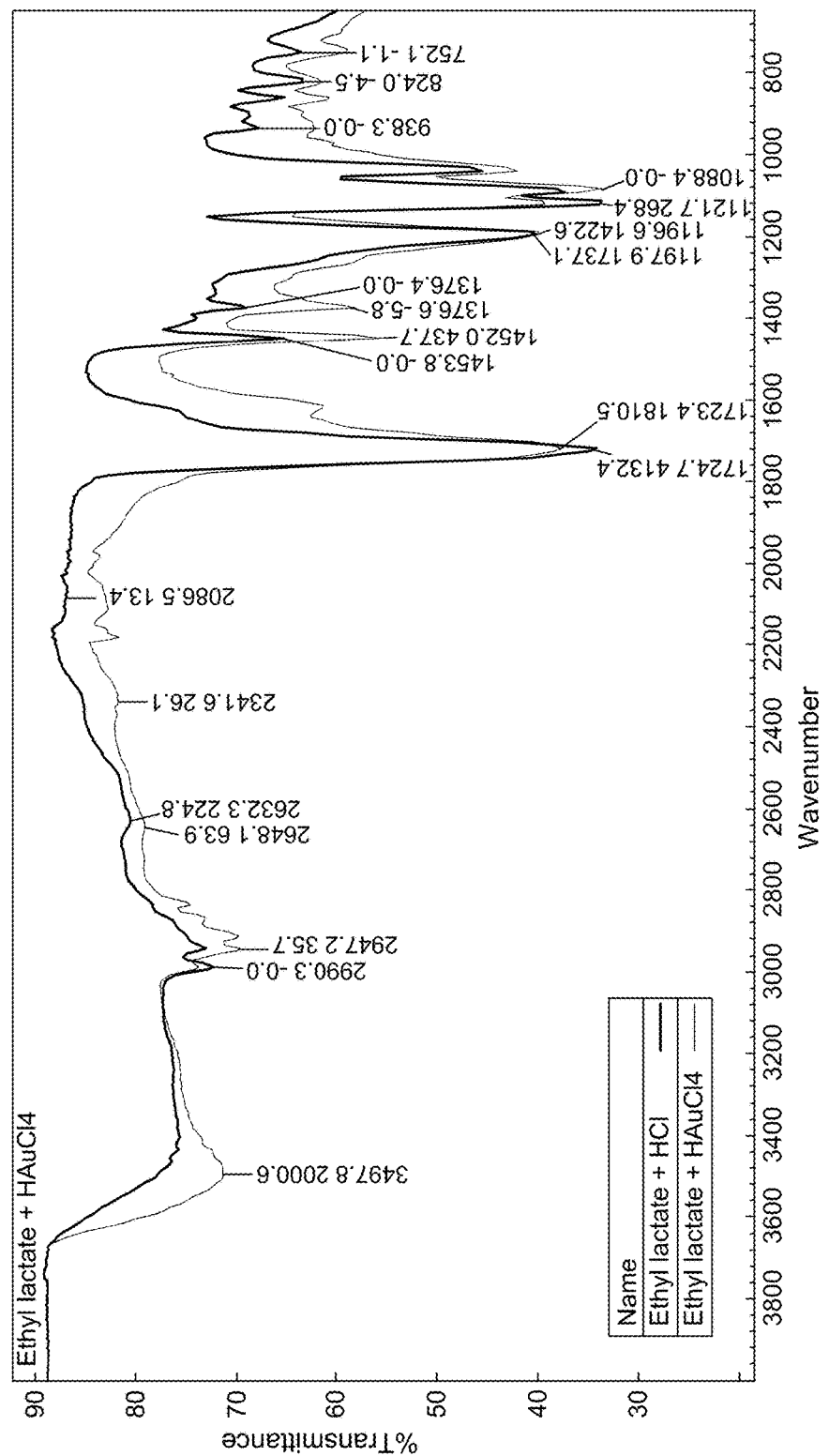
FIG. 7A is a FT-IR spectra of colloidal gold nanoparticles obtained in Example 15 (as shown in thin line) and product of heating ethyl lactate with aqueous HCl at 130° C. for 12 minutes (as shown in thick line)
Figure 7B:
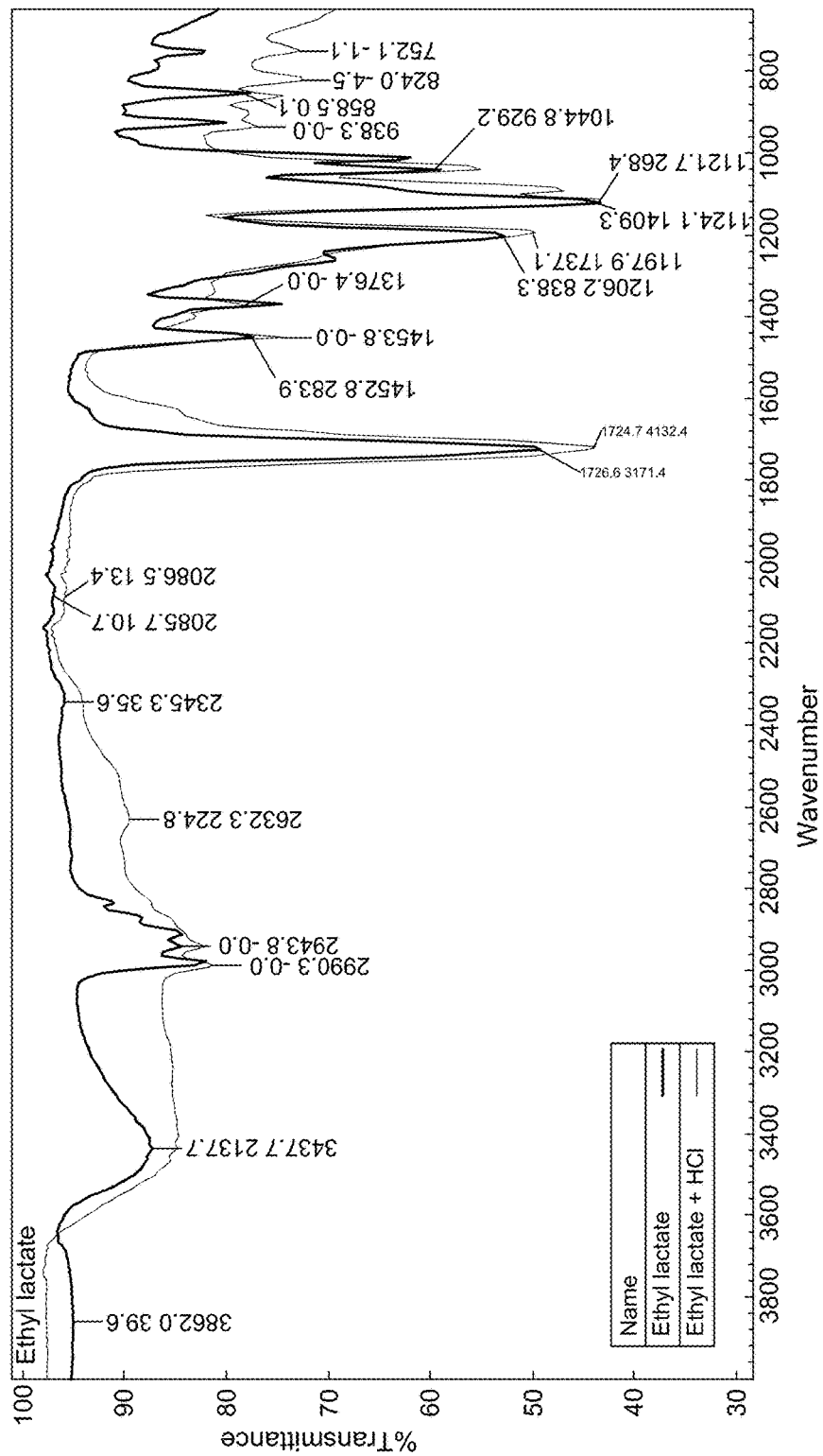
FIG. 7B is a FT-IR spectra of product of heating ethyl lactate with aqueous HCl at 130° C. for 12 minutes (as shown in thin line) and starting material of ethyl lactate (as shown in thick line)

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=1.641 as in FIG. 6. In addition, formation of colloidal gold nanoparticles was confirmed by the FT-IR spectrum as shown in FIG. 7A.

Example 16 Synthesis of Colloidal Gold Nanoparticles Using Ethyl Lactate as Reducing Agent and Citric Acid as Dispersing Agent without Heating First, in step (a), Tetrachloroauric acid (0.25 mL of 0.2 M aqueous solution, 0.05 mmol) and ethyl lactate (23.6 mg, 0.20 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 30° C. for 10 minutes to obtain colloidal gold nanoparticles, which showed the UV-Vis absorption band at λmax=525 nm with OD=2.148.

Example 17 Synthesis of Colloidal Gold Nanoparticles Using Ethyl Lactate and Lactic Acid as Combined Reducing Agent First, in step (a), Tetrachloroauric acid (0.25 mL of 0.2 M aqueous solution, 0.05 mmol) and ethyl lactate (11.6 mg, 0.10 mmol) and lactic acid (11.3 mg, 0.13 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 8.5 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=530 nm with OD=1.996.

Example 18 Synthesis of Colloidal Gold Nanoparticles Using Ethyl Lactate and 1,4-Butanediol as Combined Reducing Agent First, in step (a), Tetrachloroauric acid (0.25 mL of 0.2 M aqueous solution, 0.05 mmol) and ethyl lactate (11.5 mg, 0.10 mmol) and 1,4-butanediol (10.6 mg, 0.12 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=530 nm with OD=1.017.

Example 19 Synthesis of Colloidal Gold Nanoparticles Using Ethyl Lactate and Citric Acid as Combined Reducing Agent First, in step (a), Tetrachloroauric acid (0.25 mL of 0.2 M aqueous solution, 0.05 mmol) and ethyl lactate (17.2 mg, 0.15 mmol) and citric acid (20.9 mg, 0.11 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 10.5 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda$max=525 nm with OD=2.324.

Example 20 Synthesis of Colloidal Gold Nanoparticles Using Ethyl Lactate and PEG800 as Combined Reducing Agent First, in step (a), Tetrachloroauric acid (0.25 mL of 0.2 M aqueous solution, 0.05 mmol) and ethyl lactate (12.2 mg, 0.10 mmol) and PEG800 (81.4 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 20 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda$max=530 nm with OD=3.802.

Example 21 Synthesis of Colloidal Gold Nanoparticles Using Ethyl Lactate and PEG1000 as Combined Reducing Agent First, in step (a), Tetrachloroauric acid (0.25 mL of 0.2 M aqueous solution, 0.05 mmol) and ethyl lactate (14.0 mg, 0.12 mmol) and PEG1000 (103 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 20 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda$max=525 nm with OD=3.086.

Example 22 Synthesis of Colloidal Gold Nanoparticles Using Ethyl Lactate and PEG4000 as Combined Reducing Agent First, in step (a), Tetrachloroauric acid (0.25 mL of 0.2 M aqueous solution, 0.05 mmol) and ethyl lactate (12.9 mg, 0.11 mmol) and PEG4000 (402.8 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda$max=530 nm with OD=3.012.

Example 23 Synthesis of Colloidal Gold Nanoparticles Using Ethyl Lactate and PEG8000 as Combined Reducing Agent First, in step (a), Tetrachloroauric acid (0.25 mL of 0.2 M aqueous solution, 0.05 mmol) and ethyl lactate (11 mg, 0.09 mmol) and PEG8000 (807.5 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 8:
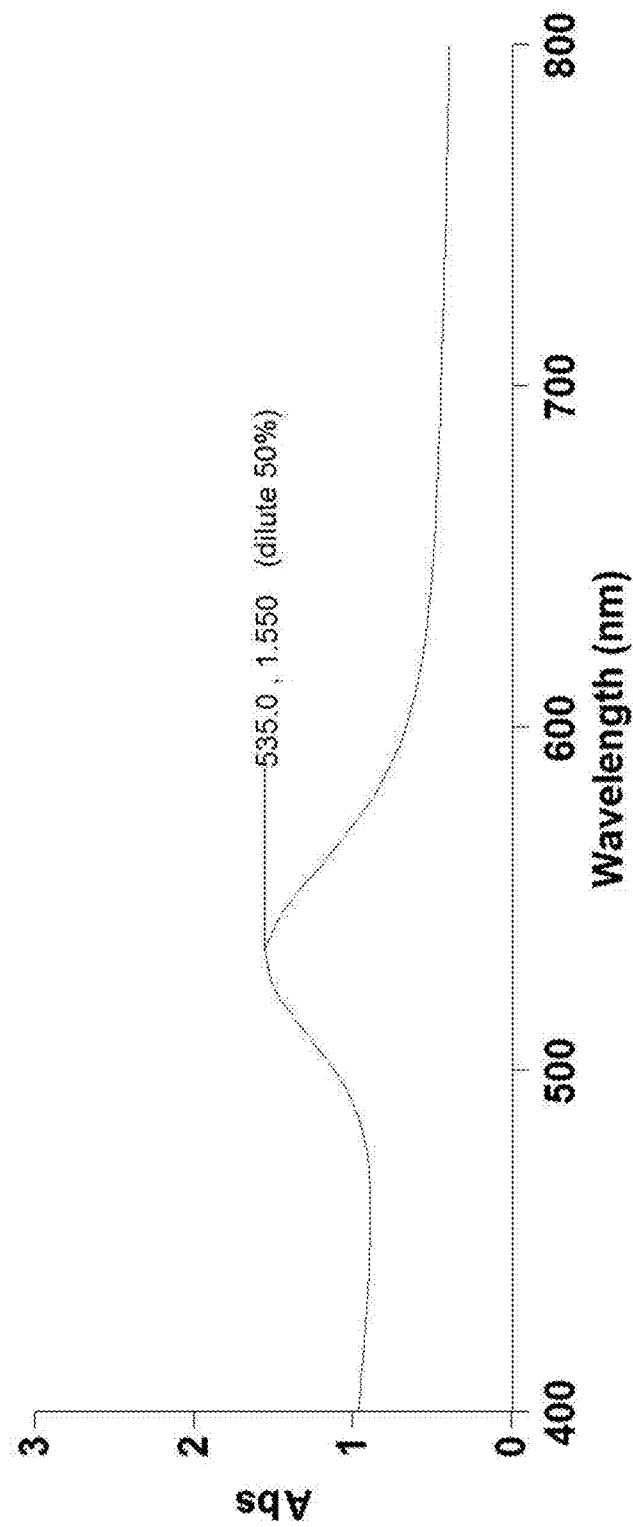
FIG. 8 is a UV-Vis spectrum of colloidal gold nanoparticles obtained in Example 23.
Figure 9:
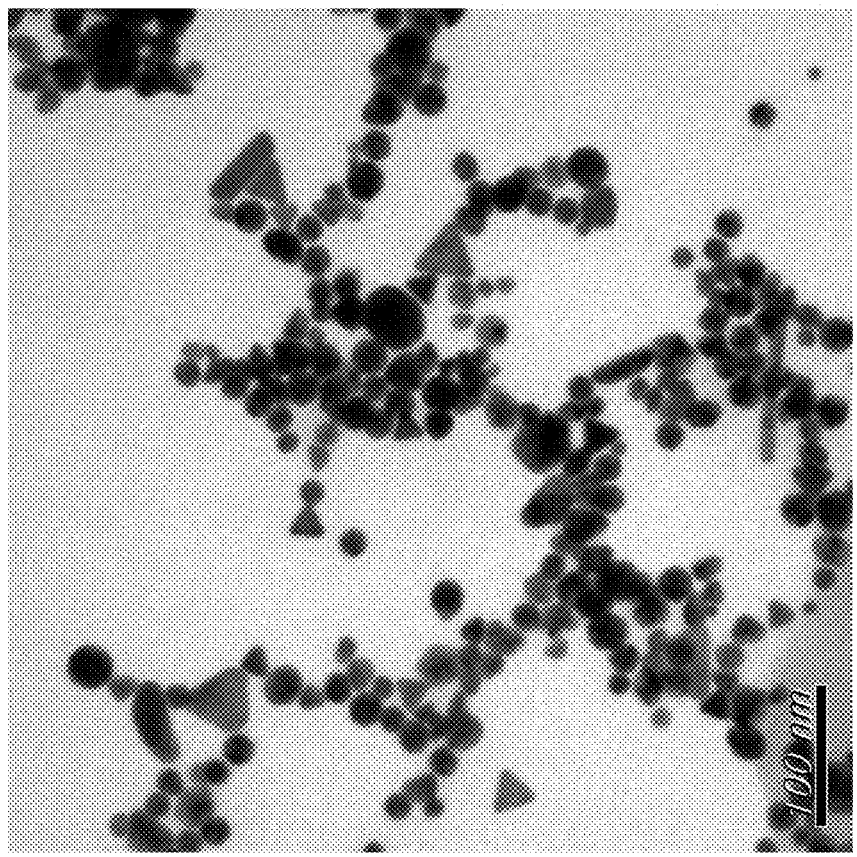
FIG. 9 is TEM image of gold nanoparticles (mean diameter of 33 nm-34 nm) obtained in Example 23.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda$max=535 nm with OD=3.1 as in FIG. 8. The mean diameter of gold nanoparticles was 33 nm to 34 nm as shown by TEM image in FIG. 9.

Example 24 Synthesis of Colloidal Gold Nanoparticles Using Ethyl Lactate and PEG10000 as Combined Reducing Agent First, in step (a), Tetrachloroauric acid (0.25 mL of 0.2 M aqueous solution, 0.05 mmol) and ethyl lactate (12.1 mg, 0.10 mmol) and PEG10000 (1.005 g) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda$max=530 nm with OD=2.882.

Example 25 Synthesis of Colloidal Gold Nanoparticles Using Ethyl Lactate and PEG11000 as Combined Reducing Agent First, in step (a), Tetrachloroauric acid (0.25 mL of 0.2 M aqueous solution, 0.05 mmol) and ethyl lactate (12.5 mg, 0.11 mmol) and PEG11000 (1.07 g) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda$max=540 nm with OD=2.996.

Example 26 Synthesis of Colloidal Gold Nanoparticles Using γ-Butyrolactone as Reducing Agent and Sodium Hydroxide as Dispersing Agent First, in step (a), Tetrachloroauric acid (0.25 mL of 0.2 M aqueous solution, 0.05 mmol) and γ-butyrolactone (18.4 mg, 0.21 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 15 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of NaOH (46.5 mg, 1.2 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda$max=565 nm with OD=0.134.

Example 27 Synthesis of Colloidal Gold Nanoparticles Using γ-Butyrolactone as Reducing Agent and Citric Acid as Dispersing Agent First, in step (a), Tetrachloroauric acid (0.25 mL of 0.2 M aqueous solution, 0.05 mmol) and γ-butyrolactone (19.3 mg, 0.22 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 10:
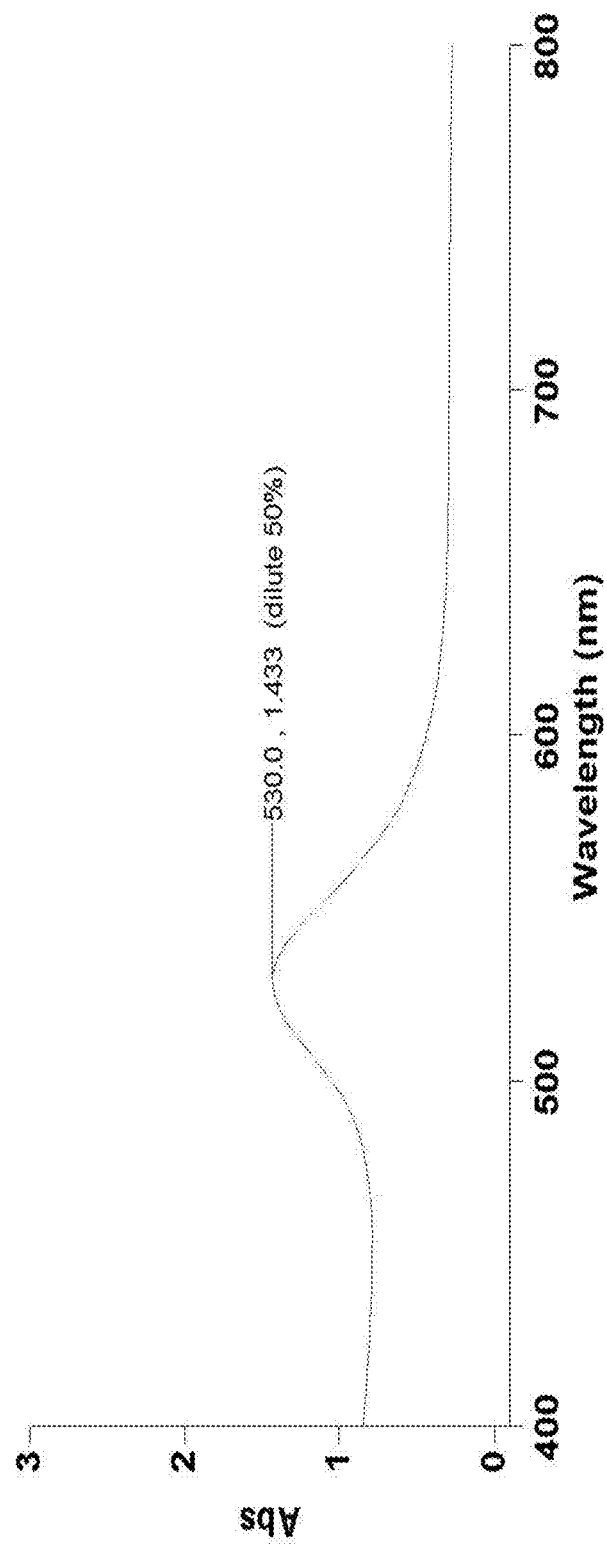
FIG. 10 is a UV-Vis spectrum of colloidal gold nanoparticles obtained in Example 27.
Figure 11A:
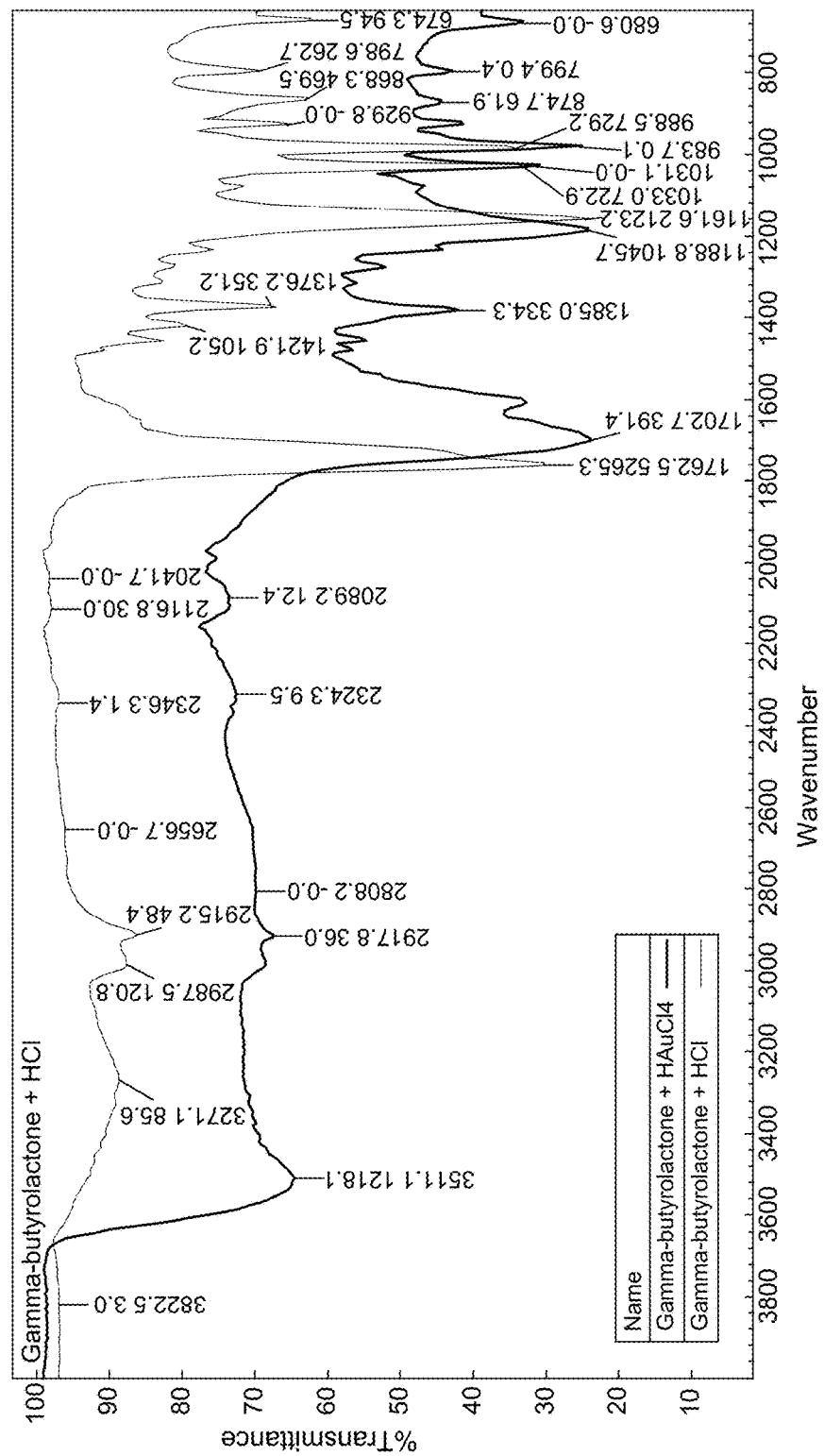
FIG. 11A is a FT-IR spectra of colloidal gold nanoparticles obtained in Example 27 (as shown in thick line) and product of heating $\gamma$-butyrolactone with aqueous HCl at 130° C. for 30 minutes (as shown in thin line)
Figure 11B:
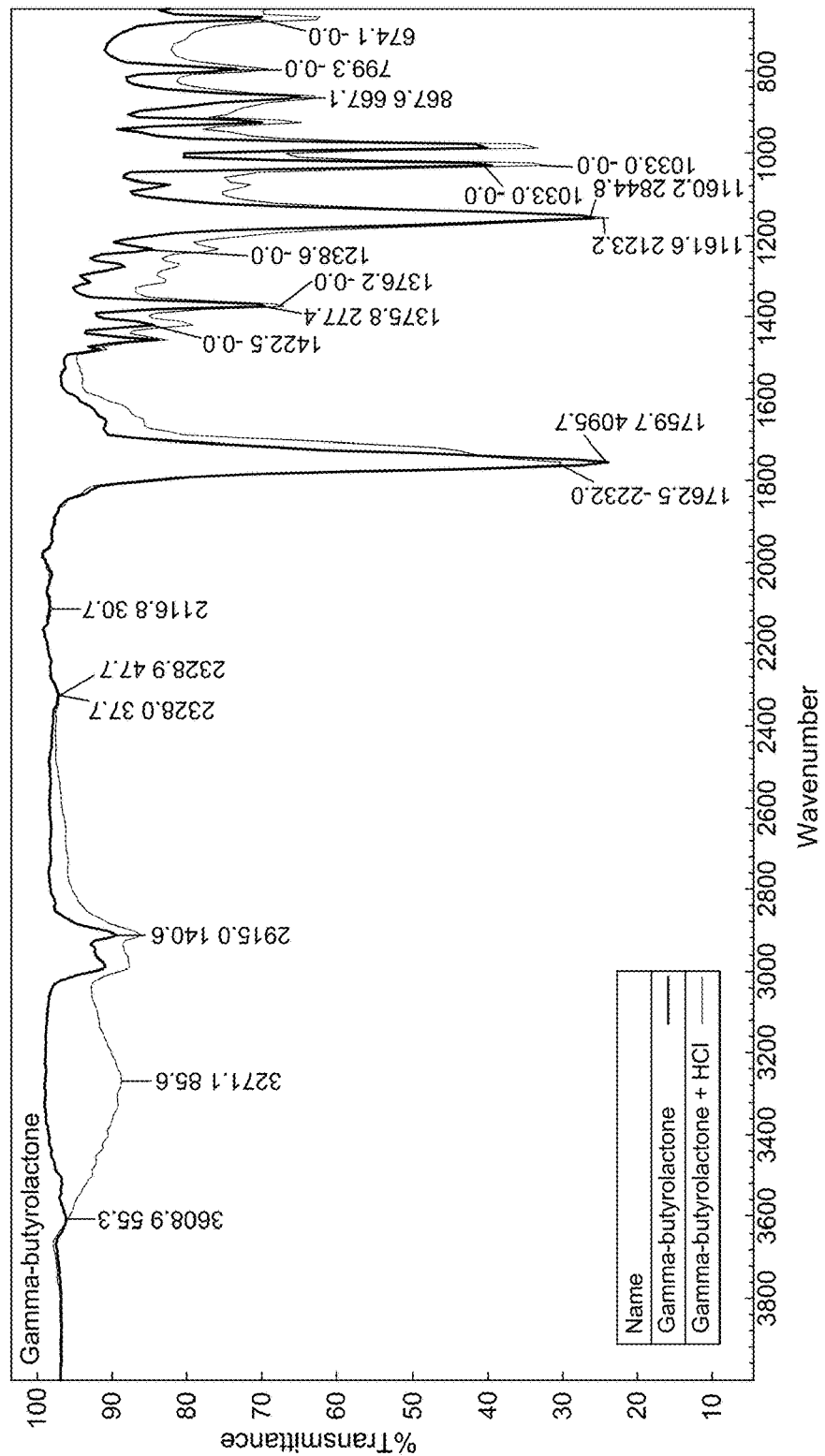
FIG. 11B is a FT-IR spectra of product of heating $\gamma$-butyrolactone with aqueous HCl at 130° C. for 30 minutes (as shown in thin line) and starting material of $\gamma$-butyrolactone (as shown in thick line)
Figure 12:
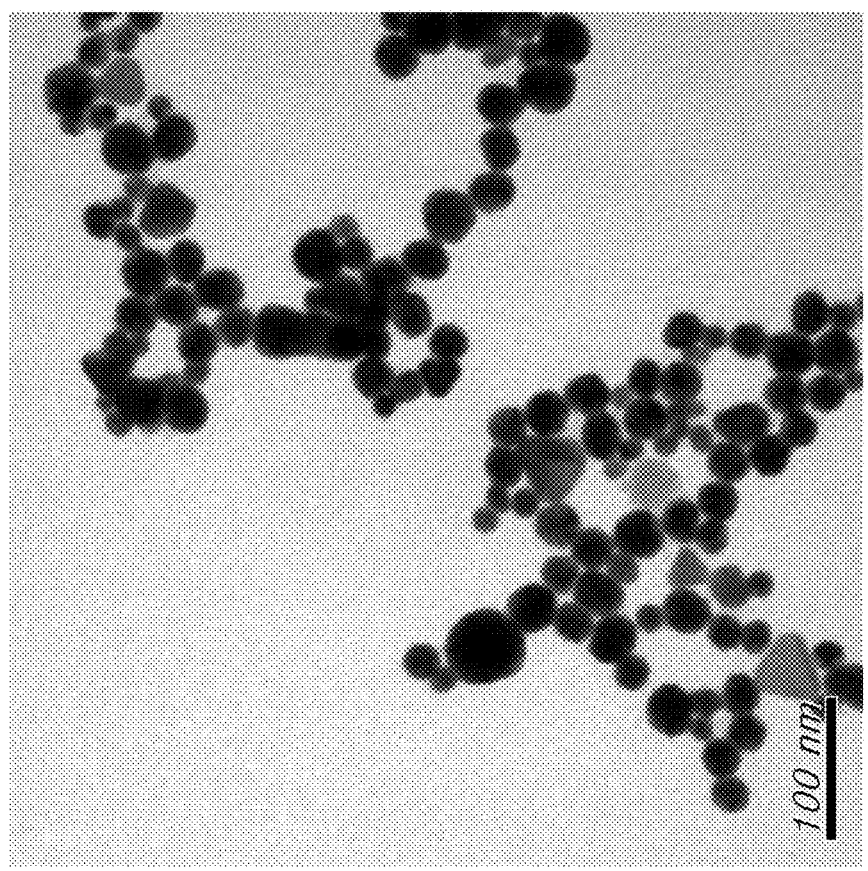
FIG. 12 is TEM image of gold nanoparticles (mean diameter of 27 nm-28 nm) obtained in Example 27.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda$max=530 nm with OD=2.866 as in FIG. 10 (measured at 50% dilution). The mean diameter of gold nanoparticles was 27 nm to 28 nm as shown by TEM image in FIG. 12. In addition, formation of colloidal gold nanoparticles was confirmed by the FT-IR spectrum as shown in FIG. 11A.

Example 28 Synthesis of Colloidal Gold Nanoparticles Using γ-Butyrolactone as Reducing Agent and Citric Acid as Dispersing Agent with Heating at 50 C First, in step (a), Tetrachloroauric acid (0.25 mL of 0.2 M aqueous solution, 0.05 mmol) and γ-butyrolactone (17.2 mg, 0.20 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 50° C. for 10 minutes to obtain colloidal gold nanoparticles, which showed the UV-Vis absorption band at $\lambda$max=525 nm with OD=2.29.

Example 29 Synthesis of Colloidal Gold Nanoparticles Using γ-Butyrolactone and Lactic Acid as Combined Reducing Agent First, in step (a), Tetrachloroauric acid (0.25 mL of 0.2 M aqueous solution, 0.05 mmol) and γ-butyrolactone (10.2 mg, 0.12 mmol) and lactic acid (11.3 mg, 0.13 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 18 minutes to perform a reduction reaction which was monitored by the IR spectrometer. The reduction reaction produced a composition containing gold nanoparticles, residues and HCl gas;

the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=1.582.

Example 30 Synthesis of Colloidal Gold Nanoparticles Using γ-Butyrolactone and Methyl Lactate as Combined Reducing Agent First, in step (a), Tetrachloroauric acid (0.25 mL of 0.2 M aqueous solution, 0.05 mmol) and γ-butyrolactone (11.9 mg, 0.14 mmol) and methyl lactate (11.3 mg, 0.11 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 17 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=0.463.

Example 31 Synthesis of Colloidal Gold Nanoparticles Using γ-Butyrolactone and Methyl Lactate as Combined Reducing Agent with a Short Reaction Time First, in step (a), Tetrachloroauric acid (0.25 mL of 0.2 M aqueous solution, 0.05 mmol) and γ-butyrolactone (11.9 mg, 0.14 mmol) and methyl lactate (11.3 mg, 0.11 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=1.496

Example 32 Synthesis of Colloidal Gold Nanoparticles Using γ-Butyrolactone and Ethyl Lactate as Combined Reducing Agent First, in step (a), Tetrachloroauric acid (0.25 mL of 0.2 M aqueous solution, 0.05 mmol) and γ-butyrolactone (11.1 mg, 0.13 mmol) and ethyl lactate (12.2 mg, 0.10 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=1.416.

Example 33 Synthesis of Colloidal Gold Nanoparticles Using Poly(Lactic Acid) as Reducing Agent First, in step (a), Tetrachloroauric acid (0.25 mL of 0.2 M aqueous solution, 0.05 mmol) and poly(lactic acid) (PLA) (90.6 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 13:
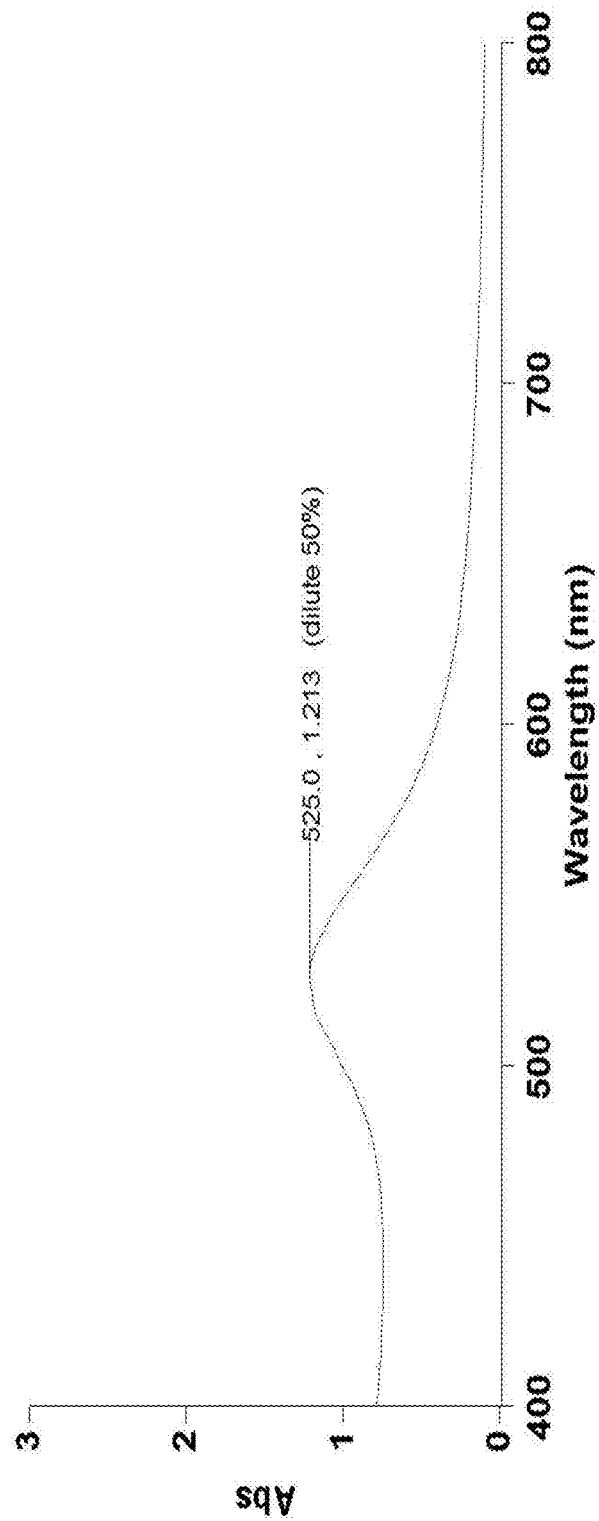
FIG. 13 is UV-Vis spectrum of colloidal gold nanoparticles obtained in Example 33.
Figure 14A:
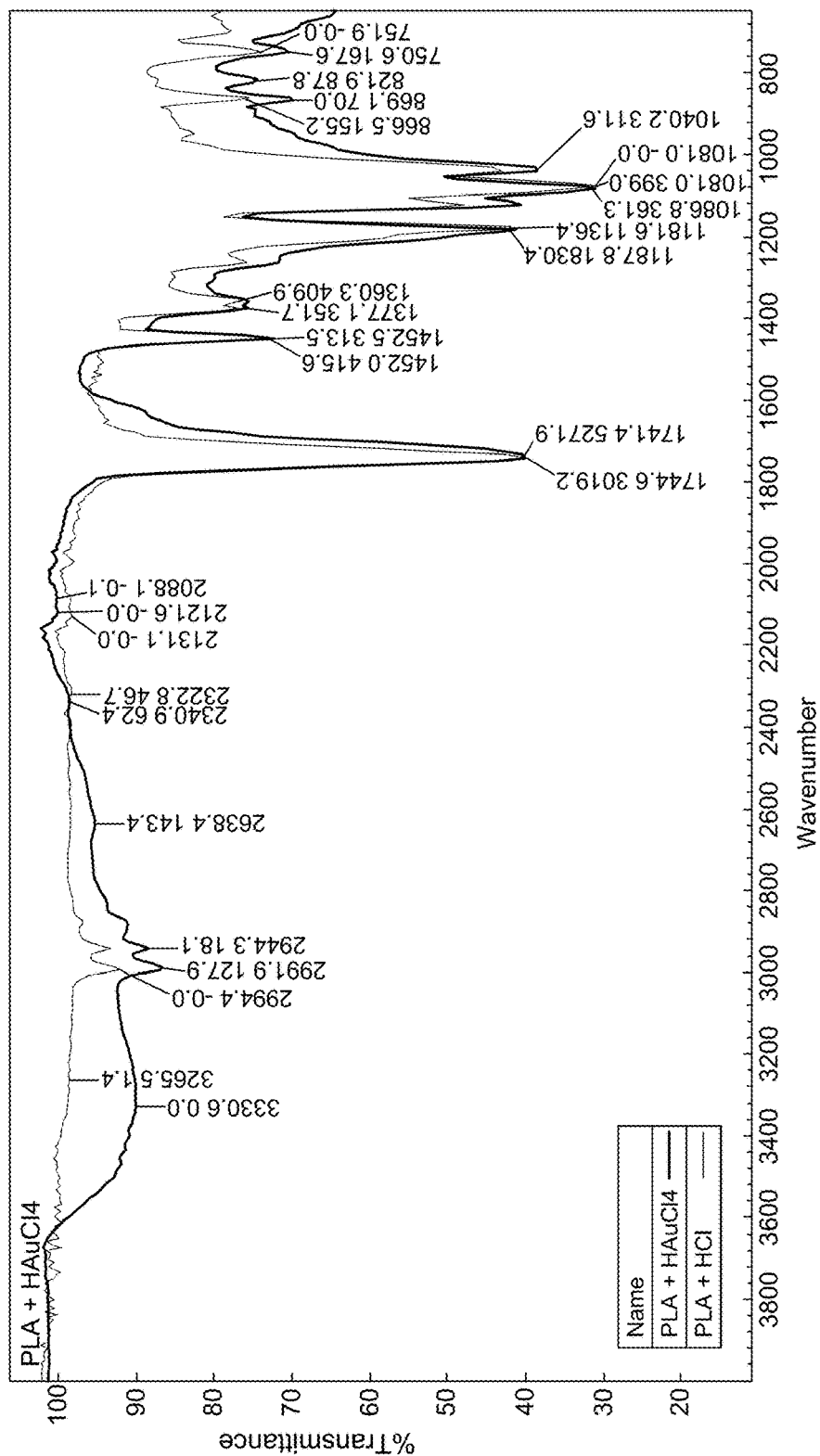
FIG. 14A is a FT-IR spectra of colloidal gold nanoparticles obtained in Example 33 (as shown in thick line) and product of heating poly(lactic acid) with aqueous HCl at 130° C. for 30 minutes (as shown in thin line)
Figure 14B:
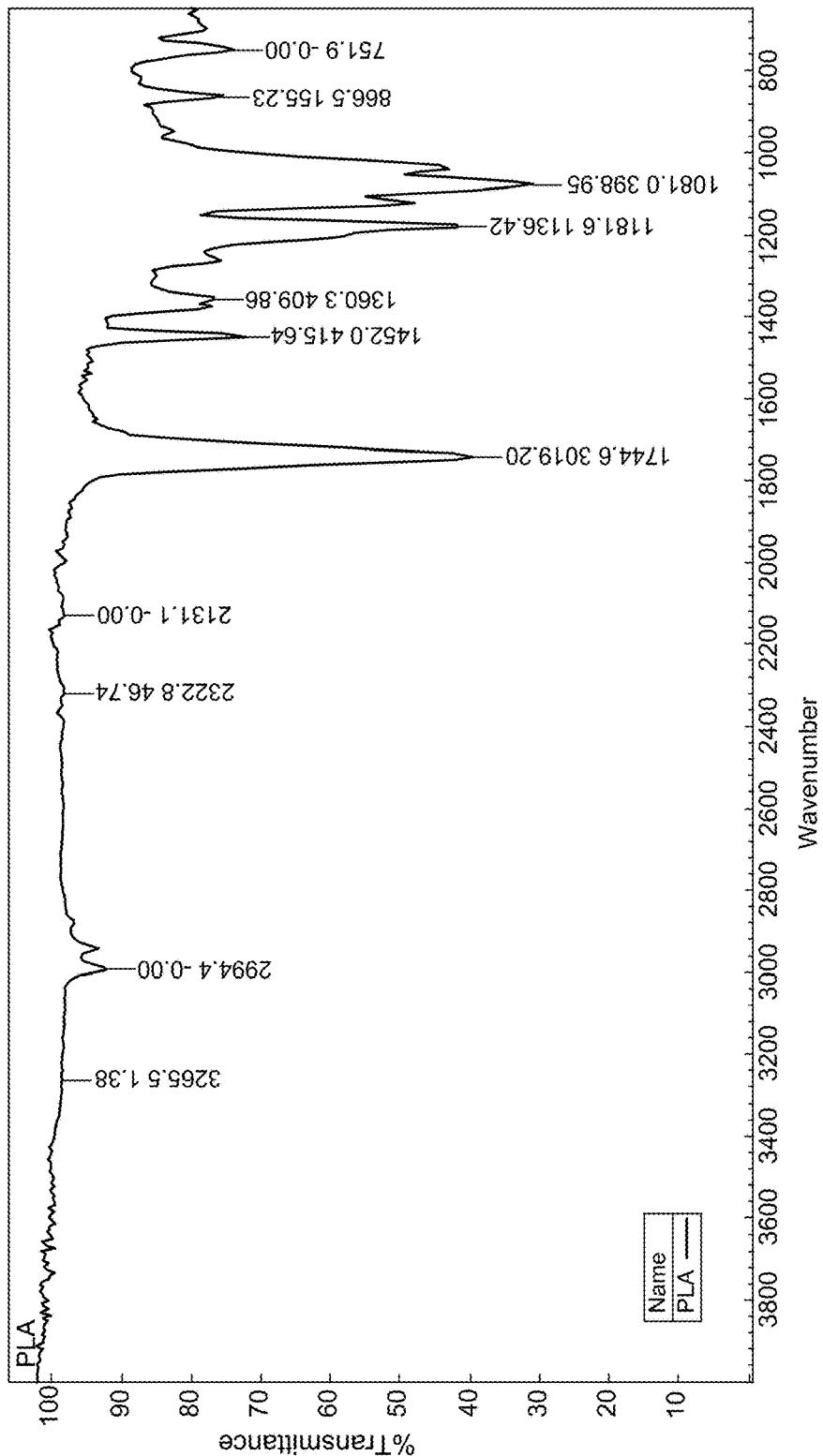
FIG. 14B is FT-IR spectrum of starting material of poly (lactic acid)

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=2.426 as FIG. 13 (measured at 50% dilution). In addition, formation of gold nanoparticles was confirmed by FT-IR spectrum as shown in FIG. 14A.

Example 34 Synthesis of Colloidal Gold Nanoparticles Using Poly(Lactic Acid) as Reducing Agent with Heating at 60° C.

First, in step (a), Tetrachloroauric acid (0.25 mL of 0.2 M aqueous solution, 0.05 mmol) and poly(lactic acid) (90.8 mg) were added via an inlet port into a double-necked flat-bottomed 100 mL reaction flask and were mixed to form a mixture solution.

Subsequently, in step (b), the flat-bottomed flask was placed on a hot plate and heated at 60° C. for 12 minutes to perform a reduction reaction which was monitored by the IR spectrometer. The reduction reaction produced a composition containing gold nanoparticles, residues and HCl gas; the amount of the residues was less than 20% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=2.444.

Example 35 Synthesis of Colloidal Gold Nanoparticles Using Glycolic Acid as Reducing Agent First, in step (a), Tetrachloroauric acid (0.25 mL of 0.2 M aqueous solution, 0.05 mmol) and glycolic acid (19.1 mg, 0.25 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 15 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 15:
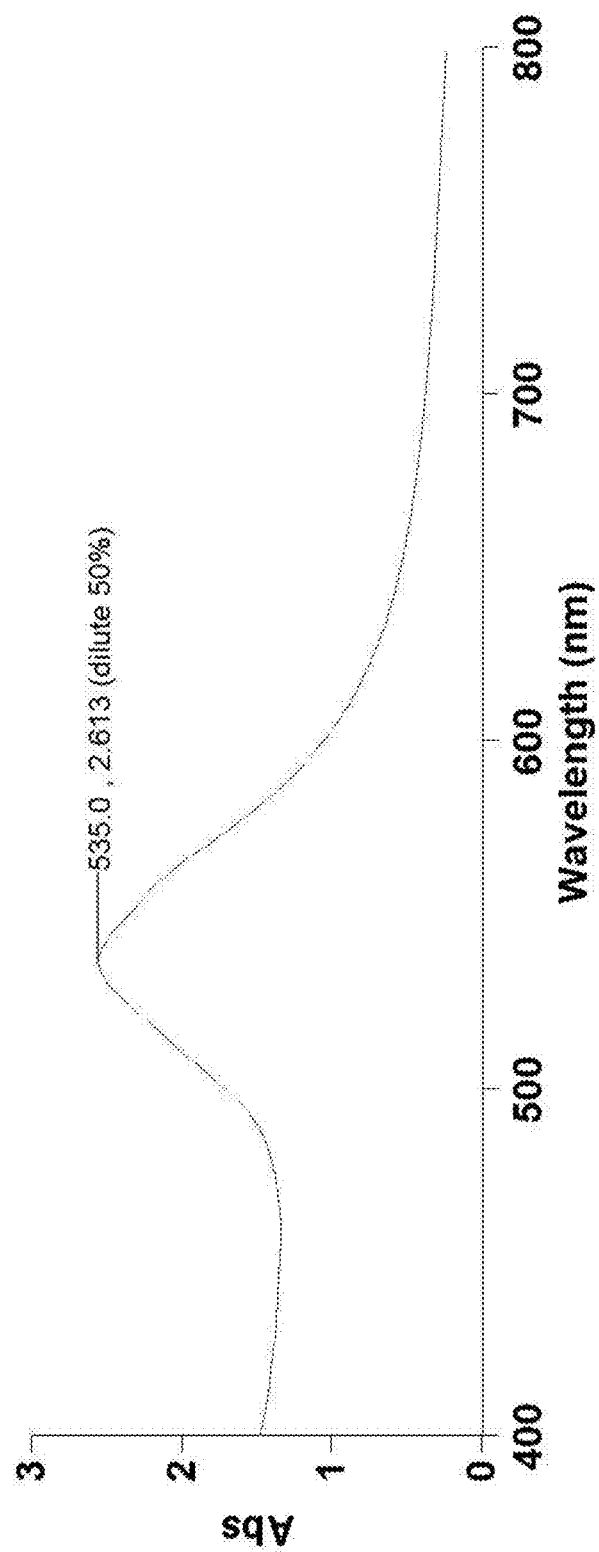
FIG. 15 is a UV-Vis spectrum of colloidal gold nanoparticles obtained in Example 35.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=535 nm with OD=5.226 as in FIG. 15, (measured at 50% dilution).

Example 36 Synthesis of Colloidal Gold Nanoparticles Using Lactic Acid as Reducing and Dispersing Agent First, in step (a), Tetrachloroauric acid (0.25 mL of 0.2 M aqueous solution, 0.05 mmol) and lactic acid (20.4 mg, 0.23 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 15 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of lactic acid (220 mg, 2.4 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=535 nm with OD=0.897.

Example 37 Synthesis of Colloidal Gold Nanoparticles Using Lactic Acid as Reducing Agent and Citric Acid as Dispersing Agent First, in step (a), Tetrachloroauric acid (0.25 mL of 0.2 M aqueous solution, 0.05 mmol) and lactic acid (21.3 mg, 0.24 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 9 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 16:
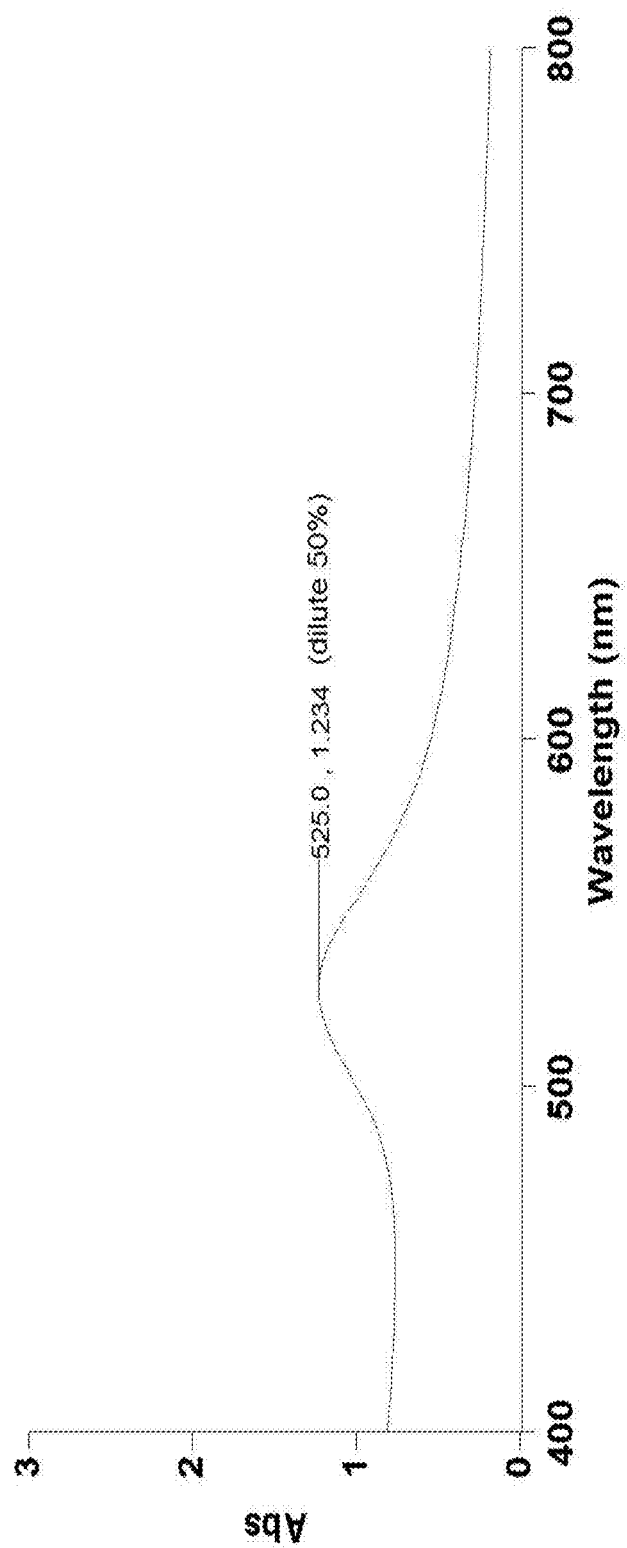
FIG. 16 is a UV-Vis spectrum of colloidal gold nanoparticles obtained in Example 37.
Figure 17A:
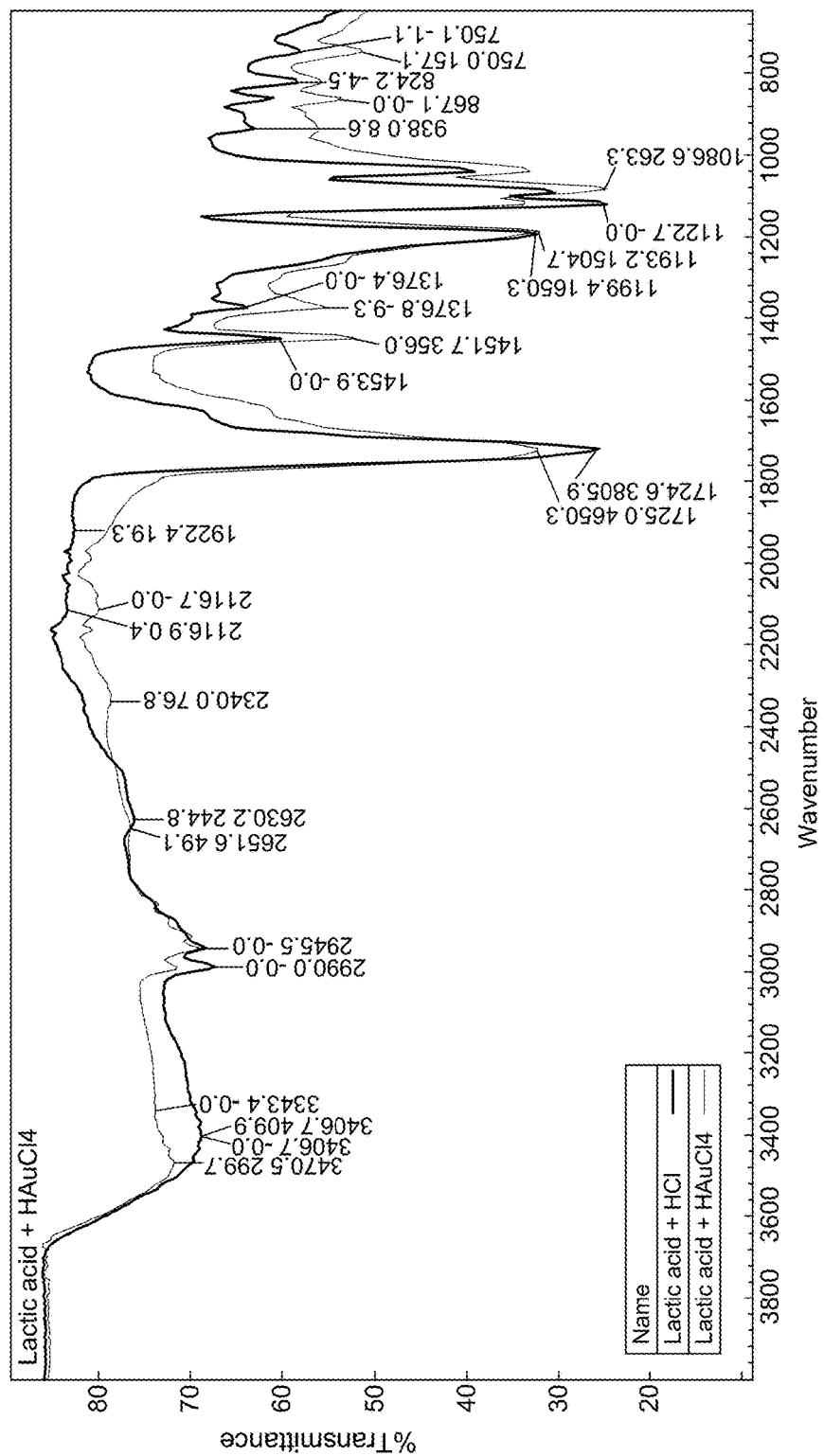
FIG. 17A is a FT-IR spectra of colloidal gold nanoparticles obtained in Example 37 (as shown in thin line) and product of heating lactic acid with aqueous HCl at 130° C. for 12 minutes (as shown in thick line)
Figure 17B:
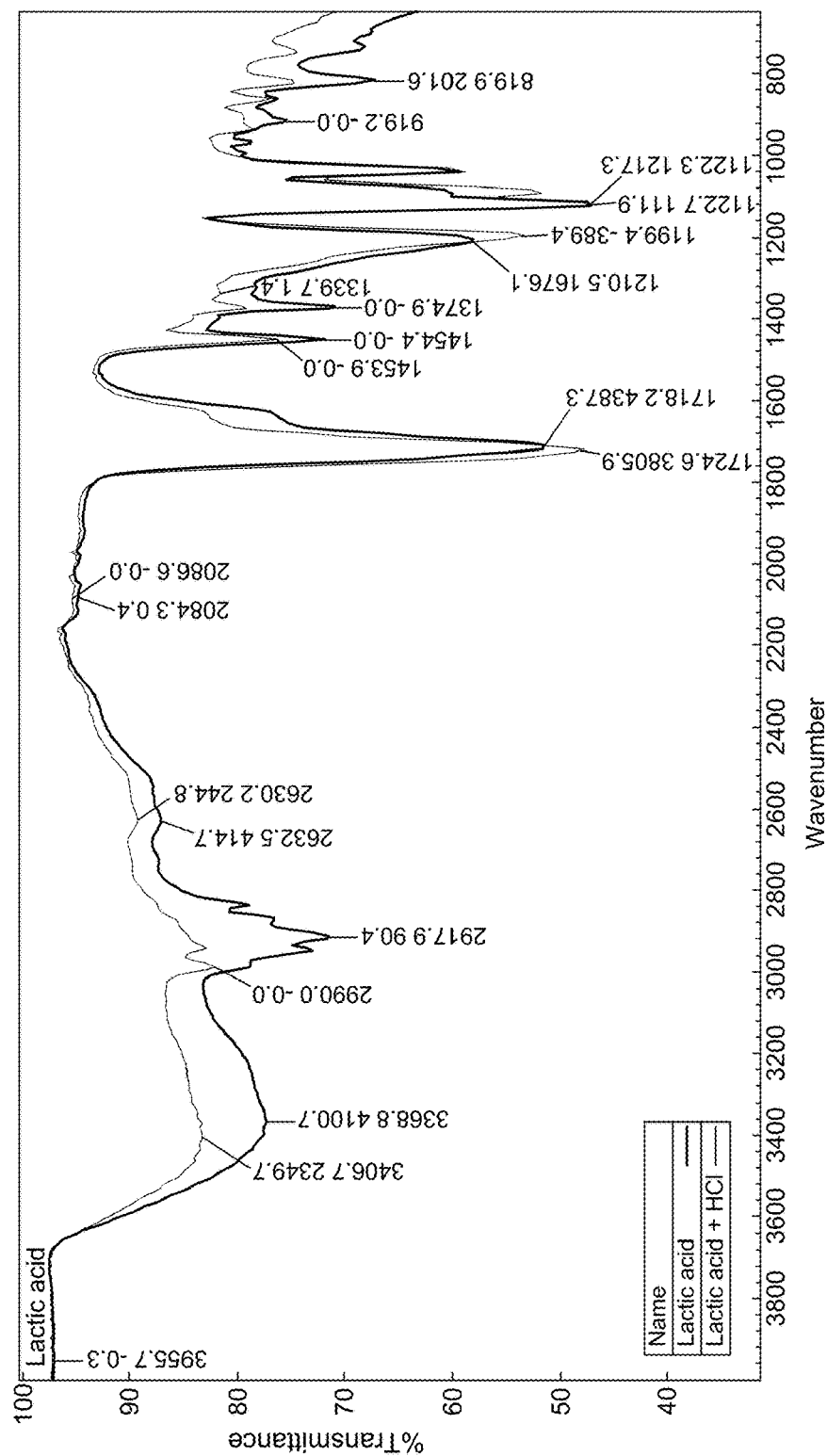
FIG. 17B is a FT-IR spectra of product of heating lactic acid with aqueous HCl at 130° C. for 12 minutes (as shown in thin line) and starting material of lactic acid (as shown in thick line)
Figure 18:
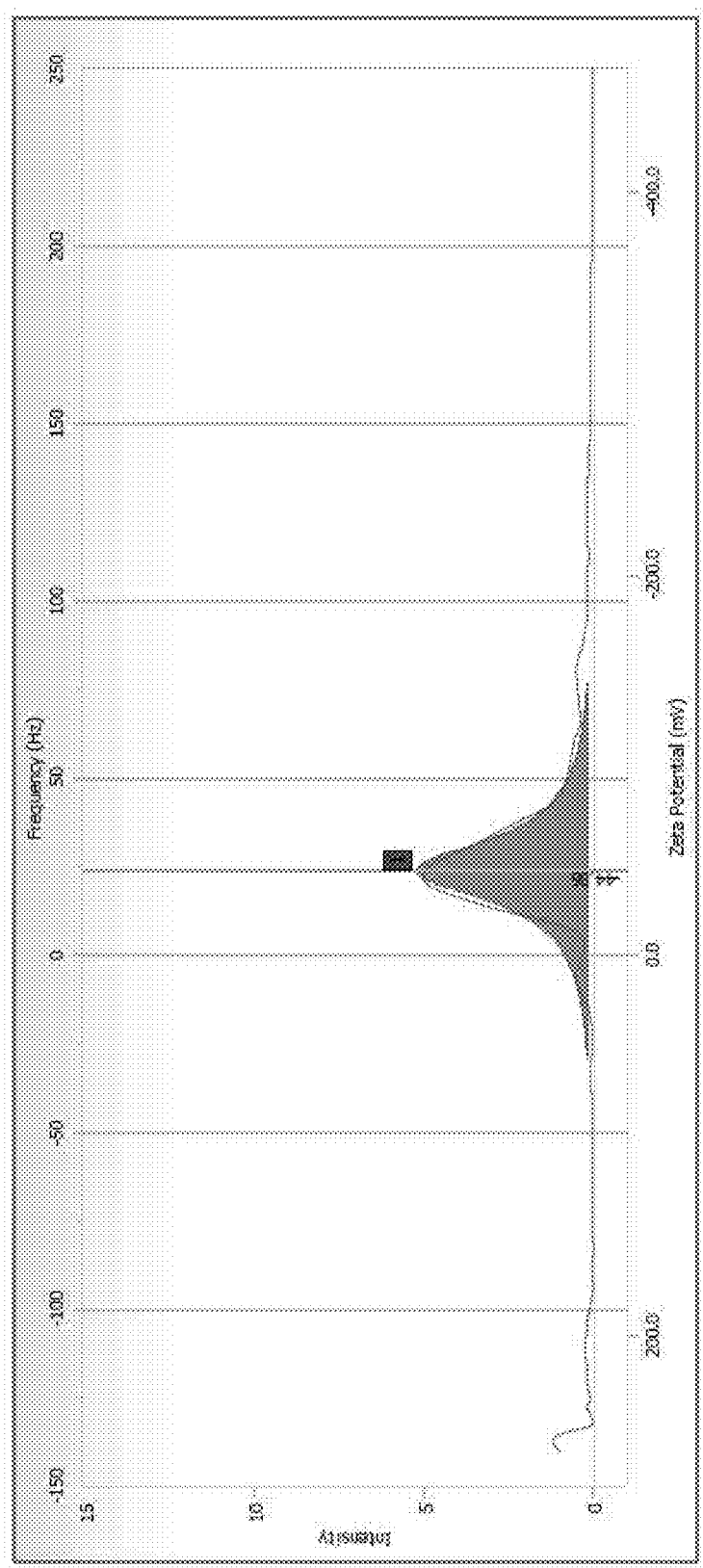
FIG. 18 is a zeta potential diagram of colloidal gold nanoparticles obtained in Example 37.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=2.468 as in FIG. 16 (measured at 50% dilution). In addition, Formation of gold nanoparticles was confirmed by FT-IR spectrum as shown in FIG. 17A. Moreover, the zeta potential of colloidal gold nanoparticles was −44.86 mV shown as in FIG. 18.

Example 38 Synthesis of Colloidal Gold Nanoparticles Using Citric Acid as Reducing First, in step (a), Tetrachloroauric acid (0.25 mL of 0.2 M aqueous solution, 0.05 mmol) and citric acid (40.3 mg, 0.21 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 19:
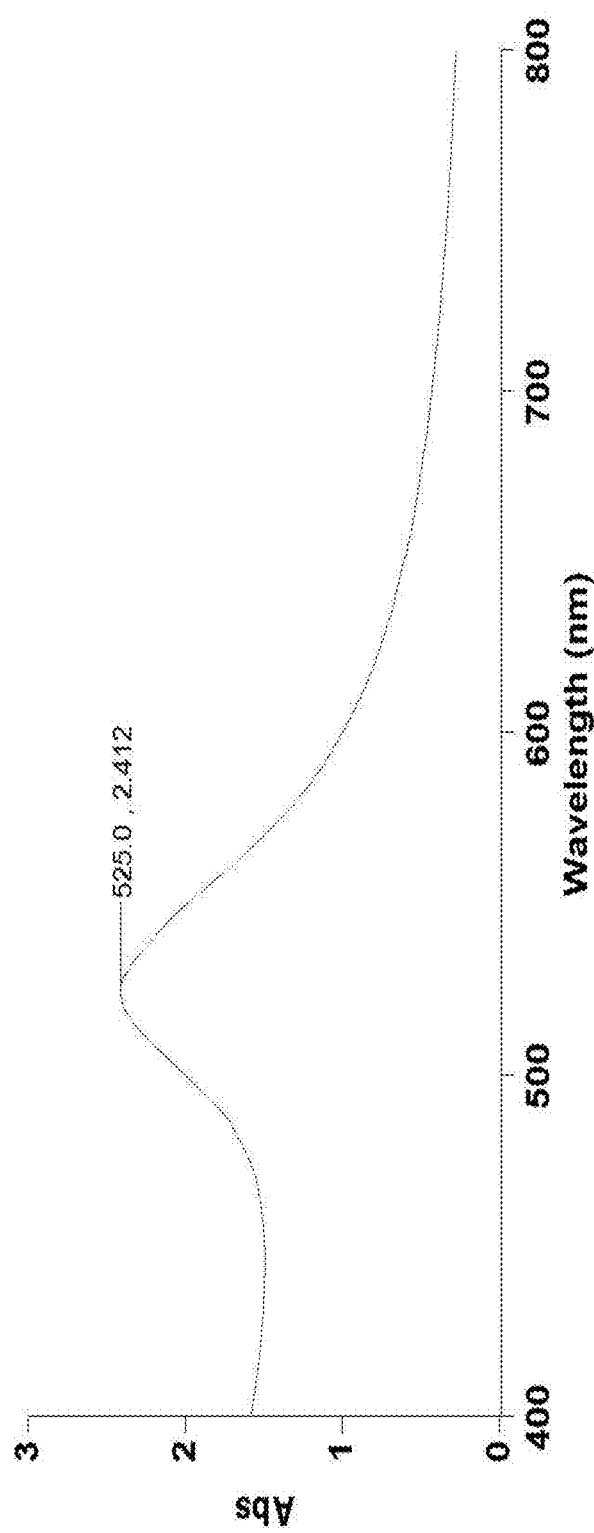
FIG. 19 is a UV-Vis spectrum of colloidal gold nanoparticles obtained in Example 38.

Finally, in step (c), 50 mL of pure water was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=2.412 as in FIG. 19.

Example 39 Larger Scale Synthesis of Colloidal Gold Nanoparticles Using Citric Acid as Reducing First, in step (a), Tetrachloroauric acid (10 mL of 0.2 M aqueous solution, 2 mmol) and citric acid (1.6 g, 83.4 mmol) were added via an inlet port into a double-necked flat-bottomed 2 L reaction flask and were mixed to form a mixture solution.

Subsequently, in step (b), the flat-bottomed flask was placed on a hot plate and heated at 130° C. for 14 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), 2 L of pure water was used as a medium to disperse the gold nanoparticles in the flat-bottomed flask, and said solution was heated at 70° C. for 30 minutes to obtain colloidal gold nanoparticles, which showed the UV-Vis absorption band at $\lambda max=525$ nm with OD=2.433.

Example 40 Synthesis of Colloidal Gold Nanoparticles Using Citric Acid as Reducing Agent and Glycerol as Dispersing Agent First, in step (a), Tetrachloroauric acid (0.5 mL of 0.2 M aqueous solution, 0.1 mmol) and citric acid (80.8 mg, 0.42 mmol) were added via an inlet port into a double-necked flat-bottomed 150 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (100 mL) of glycerol (400 mg, 4.3 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda max=525$ nm with OD=2.472.

Example 41 Synthesis of Colloidal Gold Nanoparticles Using Citric Acid as Reducing Agent and PEG as Dispersing Agent First, in step (a), Tetrachloroauric acid (0.5 mL of 0.2 M aqueous solution, 0.1 mmol) and citric acid (81.3 mg, 0.42 mmol) were added via an inlet port into a double-necked flat-bottomed 150 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (100 mL) of PEG800 (400 mg) was used as a medium to disperse the gold nanoparticles in the flat-bottomed flask, and said solution was heated at 70° C. for 10 minutes to obtain colloidal gold nanoparticles, which showed the UV-Vis absorption band at $\lambda max=525$ nm with OD=2.13.

Example 42 Synthesis of Colloidal Gold Nanoparticles Using Citric Acid as Reducing Agent with Heating at 150° C.

First, in step (a), Tetrachloroauric acid (0.25 mL of 0.2 M aqueous solution, 0.05 mmol) and citric acid (40.2 mg, 0.21 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 2 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), 50 mL of pure water was used as a medium to disperse the gold nanoparticles in the flat-bottomed flask, and said solution was heated at 70° C. for 10 minutes to obtain colloidal gold nanoparticles, which showed the UV-Vis absorption band at $\lambda max=525$ nm with OD=1.961.

Example 43 Synthesis of Colloidal Gold Nanoparticles Using Citric Acid as Reducing Agent with Heating at 70° C.

First, in step (a), Tetrachloroauric acid (0.25 mL of 0.2 M aqueous solution, 0.05 mmol) and citric acid (40.8 mg, 0.21 mmol) were added via an inlet port into a double-necked flat-bottomed 100 mL reaction flask and were mixed to form a mixture solution.

Subsequently, in step (b), the flat-bottomed flask was placed on a hot plate and heated at 70° C. for 40 minutes to perform a reduction reaction which was monitored by the IR spectrometer. The reduction reaction produced a composition containing gold nanoparticles, residues and HCl gas; the amount of the residues was less than 20% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), 50 mL of pure water was used as a medium to disperse the gold nanoparticles in the flat-bottomed flask, and said solution was heated at 70° C. for 10 minutes to obtain colloidal gold nanoparticles, which showed the UV-Vis absorption band at $\lambda max=525$ nm with OD=2.492.

Example 44 Synthesis of Colloidal Gold Nanoparticles Using Cellulose as Reducing Agent First, in step (a), Tetrachloroauric acid (0.25 mL of 0.2 M aqueous solution, 0.05 mmol) and cellulose (40.8 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 15 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 20:
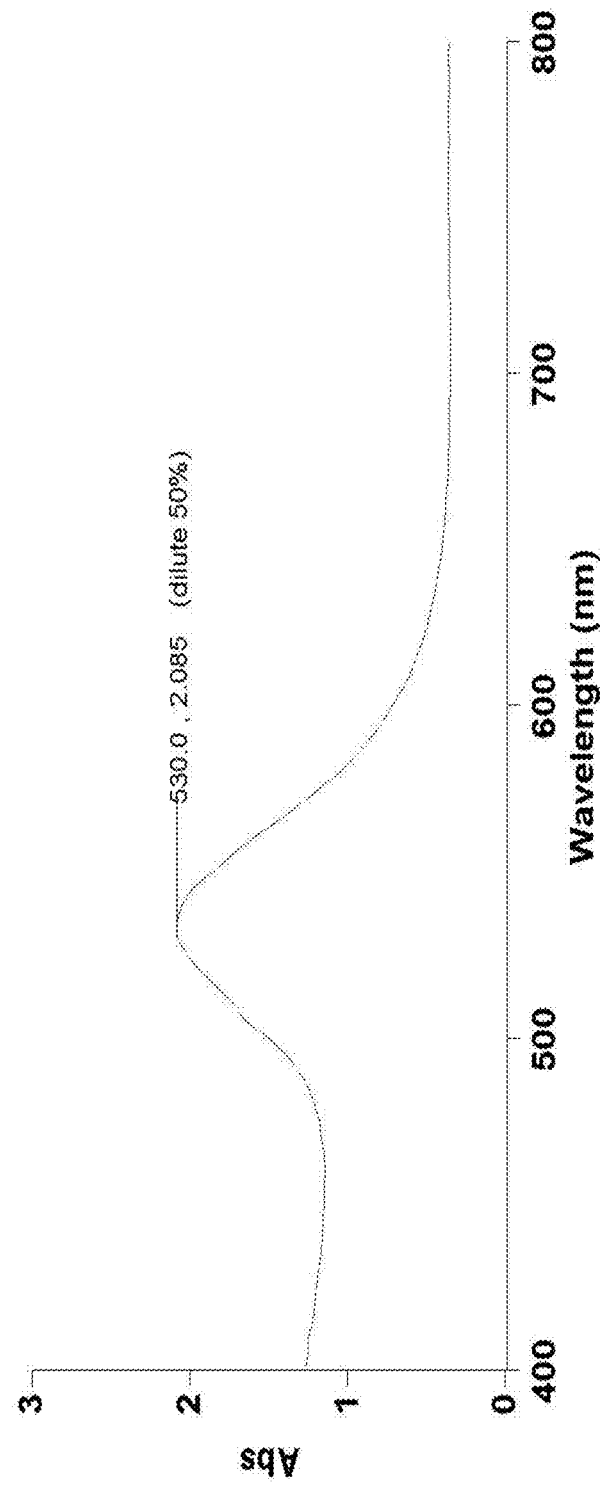
FIG. 20 is a UV-Vis spectrum of colloidal gold nanoparticles obtained in Example 44.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda max=530$ nm with OD=4.17 as in FIG. 20, (measured at 50% dilution).

Example 45 Synthesis of Colloidal Gold Nanoparticles Using Carboxymethyl Cellulose as Reducing Agent First, in step (a), Tetrachloroauric acid (0.25 mL of 0.2 M aqueous solution, 0.05 mmol) and carboxymethyl cellulose (40 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 21:
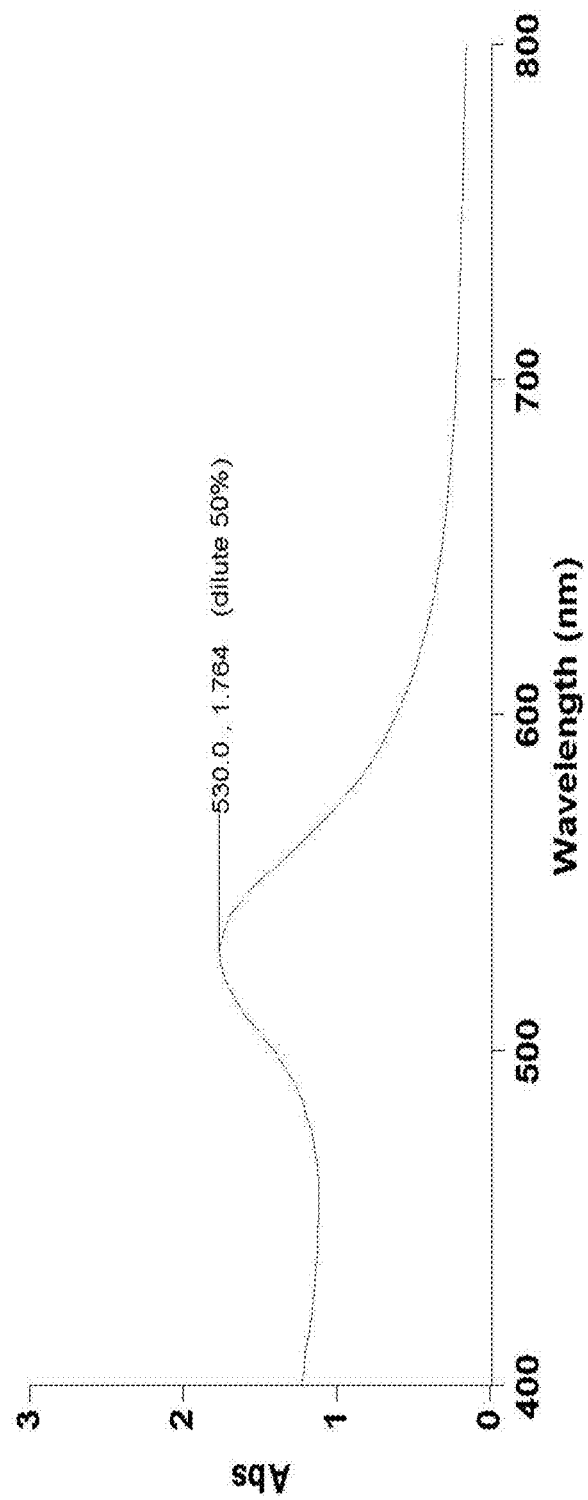
FIG. 21 is a UV-Vis spectrum of colloidal gold nanoparticles obtained in Example 45.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda max=530$ nm with OD=3.528 as in FIG. 21 (measured at 50% dilution).

Example 46 Synthesis of Colloidal Gold Nanoparticles Using Chitin as Reducing Agent First, in step (a), Tetrachloroauric acid (0.25 mL of 0.2 M aqueous solution, 0.05 mmol) and chitin (41.6 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 15 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 22:
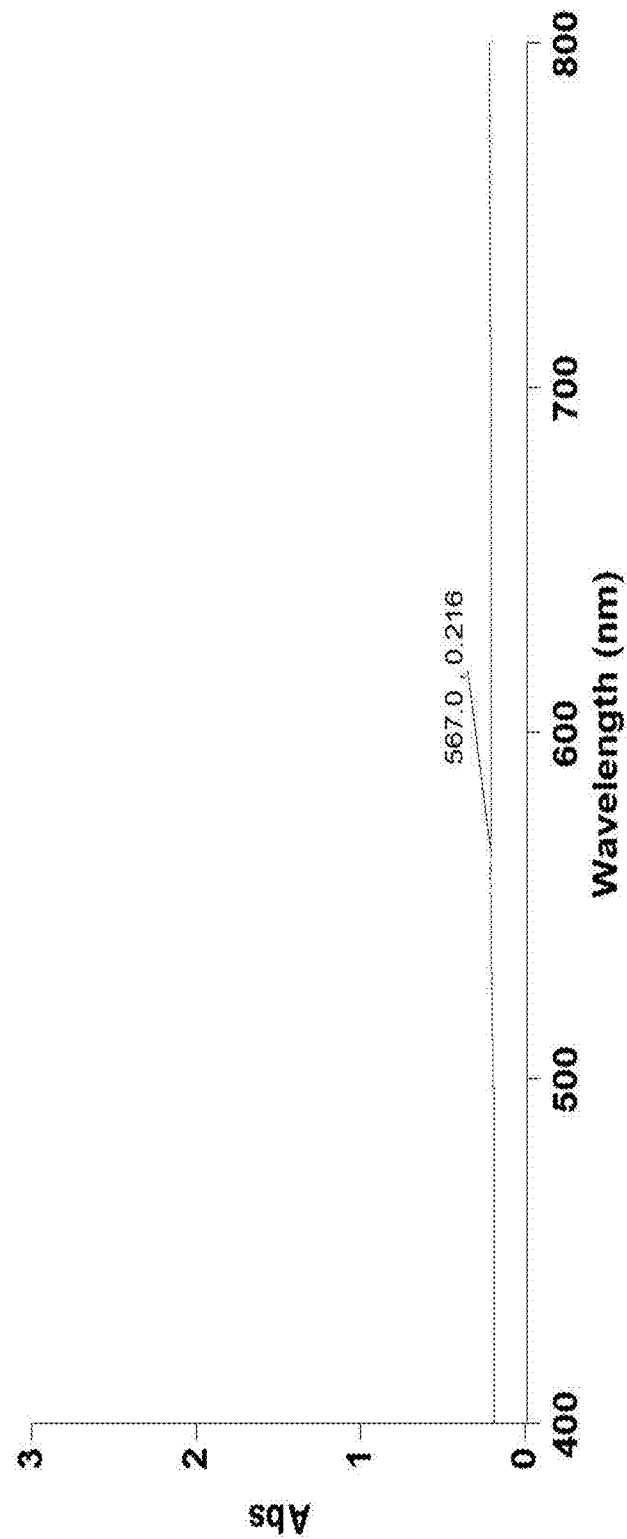
FIG. 22 is a UV-Vis spectrum of colloidal gold nanoparticles obtained in Example 46.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda max=567$ nm with OD=0.216 as in FIG. 22.

Example 47 Synthesis of Colloidal Gold Nanoparticles Using Chitosan as Reducing Agent First, in step (a), Tetrachloroauric acid (0.25 mL of 0.2 M aqueous solution, 0.05 mmol) and chitosan (81.6 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 15 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 23:
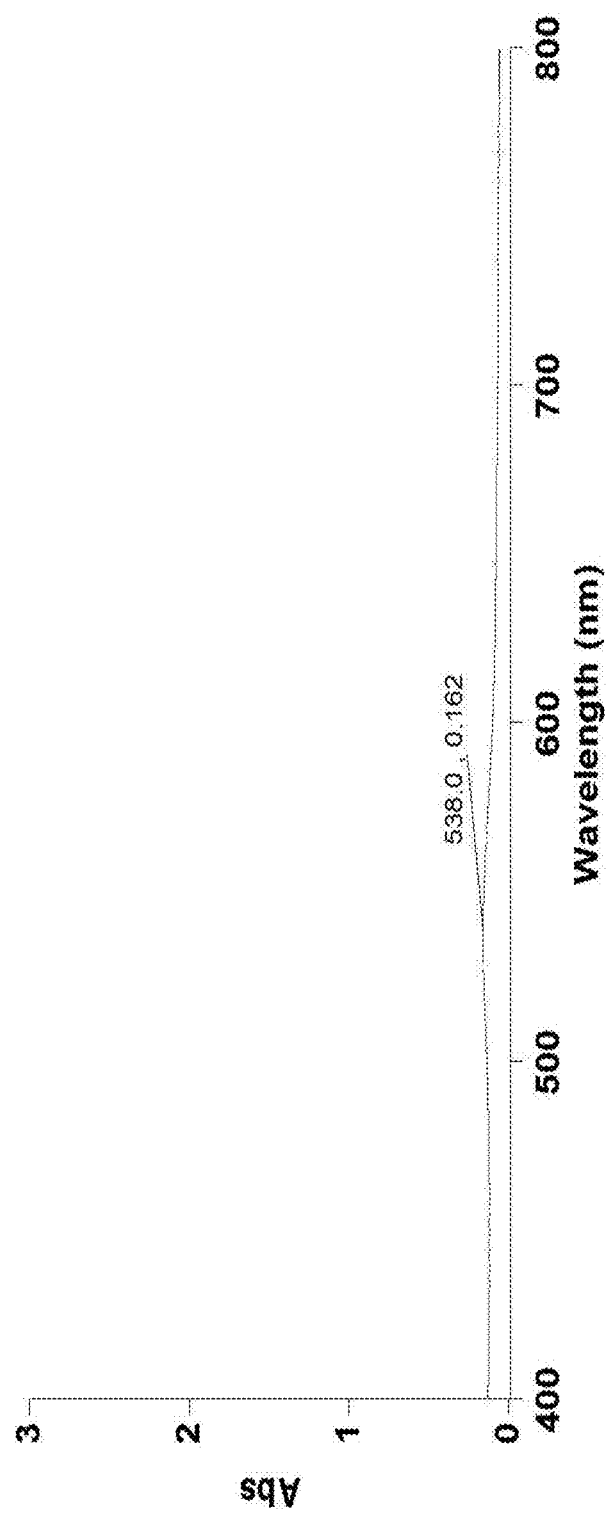
FIG. 23 is a UV-Vis spectrum of colloidal gold nanoparticles obtained in Example 47.
Figure 24:
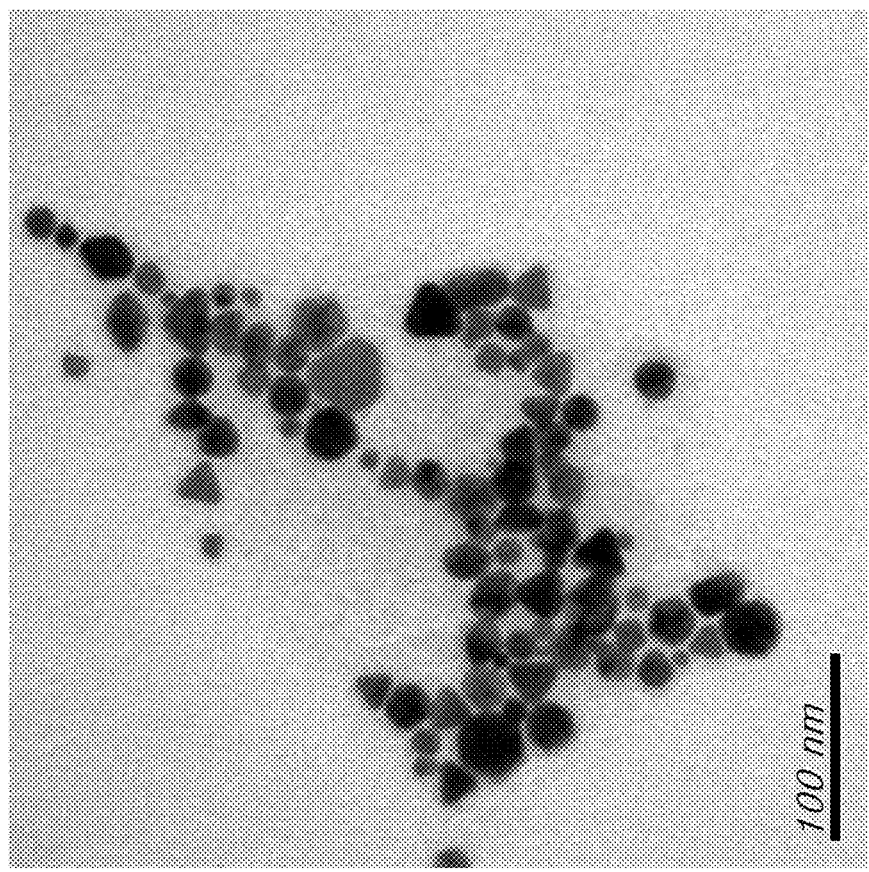
FIG. 24 is TEM image of gold nanoparticles (mean diameter of 38 nm-39 nm) obtained in Example 47.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at $\lambda max=538$ nm with OD=0.162 as in FIG. 23. The mean diameter of gold nanoparticles was estimated to be 38 nm to 39 nm as shown by TEM image in FIG. 24; however, the shape and size of said gold nanoparticles were not homogeneous.

Example 48 Synthesis of Colloidal Gold Nanoparticles Using Poly(Vinylpyrrolidone) as Reducing Agent and Dispersing Agent First, in step (a), Tetrachloroauric acid (0.25 mL of 0.2 M aqueous solution, 0.05 mmol) and poly(vinylpyrrolidone) (PVP, 48.5 mg) were added via an inlet port into a double-necked flat-bottomed 100 mL reaction flask and were mixed to form a mixture solution.

Subsequently, in step (b), the flat-bottomed flask was placed on a hot plate and heated at 150° C. for 80 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of PVP (200 mg) was used as a medium to disperse the gold nanoparticles in the flat-bottomed flask, and said solution was heated at 60° C. for 10 minutes to obtain colloidal gold nanoparticles, which showed the UV-Vis absorption band at $\lambda max=535$ nm with OD=2.76.

Example 49 Synthesis of Colloidal Gold Nanoparticles Using Lactic Acid and 1,4-Butanediol as Combined Reducing Agent First, in step (a), Tetrachloroauric acid (0.25 mL of 0.2 M aqueous solution, 0.05 mmol) and lactic acid (11.8 mg, 0.13 mmol) and 1,4-butanediol (10.8 mg, 0.12 mmol) were added via an inlet port into a double-necked flat-bottomed 100 mL reaction flask and were mixed to form a mixture solution.

Subsequently, in step (b), the flat-bottomed flask was placed on a hot plate and heated at 130° C. for 12 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=530 nm with OD=1.254.

Example 50 Synthesis of Colloidal Gold Nanoparticles Using Lactic Acid and Citric Acid as Combined Reducing Agent First, in step (a), Tetrachloroauric acid (0.25 mL of 0.2 M aqueous solution, 0.05 mmol) and lactic acid (15.5 mg, 0.17 mmol) and citric acid (20.3 mg, 0.11 mmol) were added via an inlet port into a double-necked flat-bottomed 100 mL reaction flask and was mixed to form a mixture solution.

Subsequently, in step (b), the flat-bottomed flask was placed on a hot plate and heated at 130° C. for 10.5 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=2.872.

Example 51 Synthesis of Colloidal Gold Nanoparticles Using Lactic Acid and PEG800 as Combined Reducing Agent First, in step (a), Tetrachloroauric acid (0.25 mL of 0.2 M aqueous solution, 0.05 mmol) and lactic acid (11.3 mg, 0.13 mmol) and PEG800 (80.9 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 17.5 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=2.906.

Example 52 Synthesis of Colloidal Gold Nanoparticles Using Lactic Acid and PEG1000 as Combined Reducing Agent First, in step (a), Tetrachloroauric acid (0.25 mL of 0.2 M aqueous solution, 0.05 mmol) and lactic acid (11.2 mg, 0.12 mmol) and PEG1000 (101.9 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 17.5 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=2.996.

Example 53 Synthesis of Colloidal Gold Nanoparticles Using Lactic Acid and PEG4000 as Combined Reducing Agent First, in step (a), Tetrachloroauric acid (0.25 mL of 0.2 M aqueous solution, 0.05 mmol) and lactic acid (11.1 mg, 0.12 mmol) and PEG4000 (400.2 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=525 nm with OD=2.836.

Example 54 Synthesis of Colloidal Gold Nanoparticles Using Lactic Acid and PEG8000 as Combined Reducing Agent First, in step (a), Tetrachloroauric acid (0.25 mL of 0.2 M aqueous solution, 0.05 mmol) and lactic acid (10.5 mg, 0.12 mmol) and PEG8000 (802.3 mg) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=535 nm with OD=3.166.

Example 55 Synthesis of Colloidal Gold Nanoparticles Using Lactic Acid and PEG10000 as Combined Reducing Agent First, in step (a), Tetrachloroauric acid (0.25 mL of 0.2 M aqueous solution, 0.05 mmol) and lactic acid (11.7 mg, 0.13 mmol) and PEG10000 (1.042 g) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=535 nm with OD=3.12.

Example 56 Synthesis of Colloidal Gold Nanoparticles Using Lactic Acid and PEG11000 as Combined Reducing Agent First, in step (a), Tetrachloroauric acid (0.25 mL of 0.2 M aqueous solution, 0.05 mmol) and lactic acid (11.7 mg, 0.13 mmol) and PEG11000 (1.109 g) were added via an inlet port into a double-necked flat-bottomed 100 mL reaction flask and were mixed to form a mixture solution.

Subsequently, in step (b), the flat-bottomed flask was placed on a hot plate and heated at 130° C. for 30 minutes to perform a reduction reaction which was monitored by the IR spectrometer. The reduction reaction produced a composition containing gold nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (200 mg, 1.0 mmol) was used as a medium to disperse the gold nanoparticles in the flat-bottomed flask, and said solution was heated at 70° C. for 10 minutes to obtain colloidal gold nanoparticles, which showed the UV-Vis absorption band at λmax=535 nm with OD=3.282.

Example 57 Synthesis of Colloidal Silver Nanoparticles Using Methyl Lactate as Reducing Agent First, in step (a), silver nitrate (0.1 mL of 0.1 M aqueous solution, 0.01 mmol) and methyl lactate (24.5 mg, 0.24 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing silver nanoparticles, residues and $NO_2$ gas; the amount of the residues was almost 0% by volume of the mixture solution. At the same time, $NO_2$ gas produced from the reduction reaction was through the recovery port attached to the flat-bottomed flask and was trapped with 10 mL water in an Erlenmeyer flask for collection.

Finally, in step (c), an aqueous solution (50 mL) of citric acid (33.6 mg, 0.17 mmol) and NaOH (46.5 mg, 1.12 mmol) was used as a medium to disperse the silver nanoparticles in the flat-bottomed flask, and said solution was heated at 70° C. for 15 minutes to obtain colloidal silver nanoparticles, which showed the UV-Vis absorption band at λmax=390 nm with OD=2.433.

Example 58 Synthesis of Colloidal Silver Nanoparticles Using Methyl Lactate and Citric Acid as Combined Reducing Agent First, in step (a), silver nitrate (0.1 mL of 0.1 M aqueous solution, 0.01 mmol) and citric acid (45.9 mg, 0.24 mmol) and methyl lactate (11.4 mg, 0.11 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing silver nanoparticles, residues and $NO_2$ gas; the amount of the residues was almost 0% by volume of the mixture solution. At the same time, $NO_2$ gas produced from the reduction reaction was through the recovery port attached to the flat-bottomed flask and was trapped with 10 mL water in an Erlenmeyer flask for collection.

Figure 25:
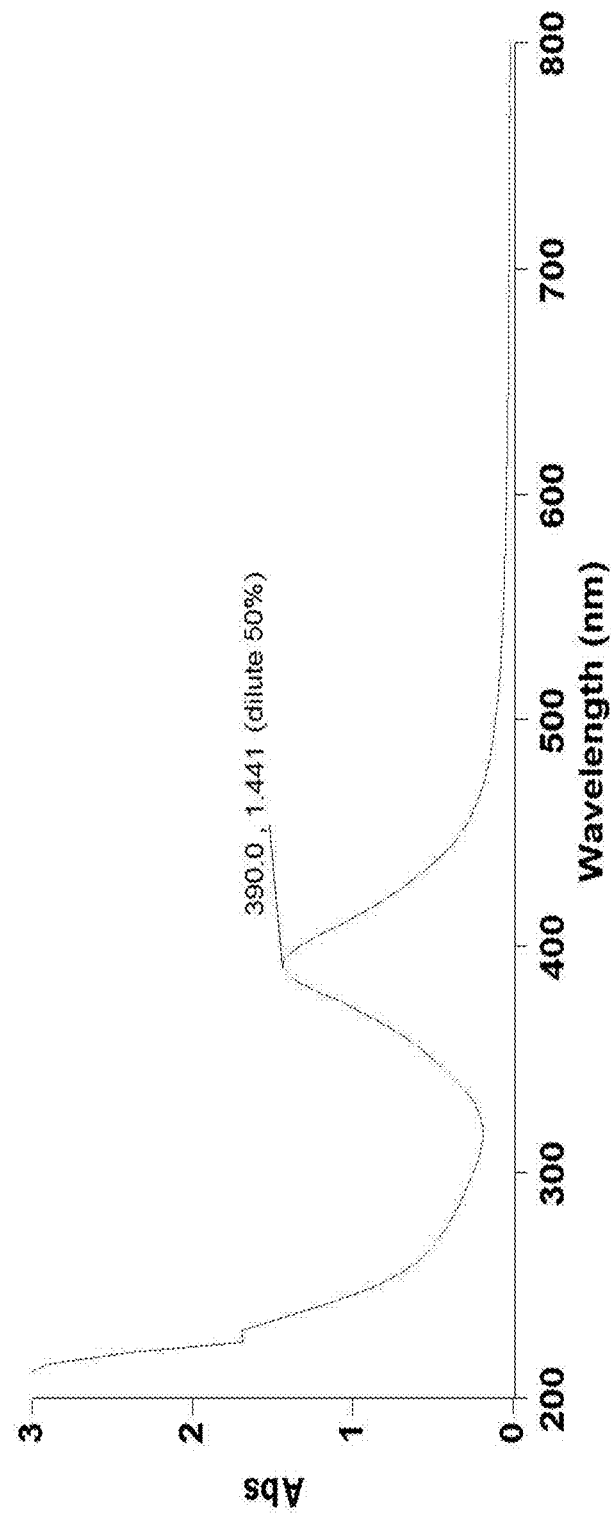
FIG. 25 is a UV-Vis spectrum of colloidal silver nanoparticles obtained in Example 58.
Figure 26:
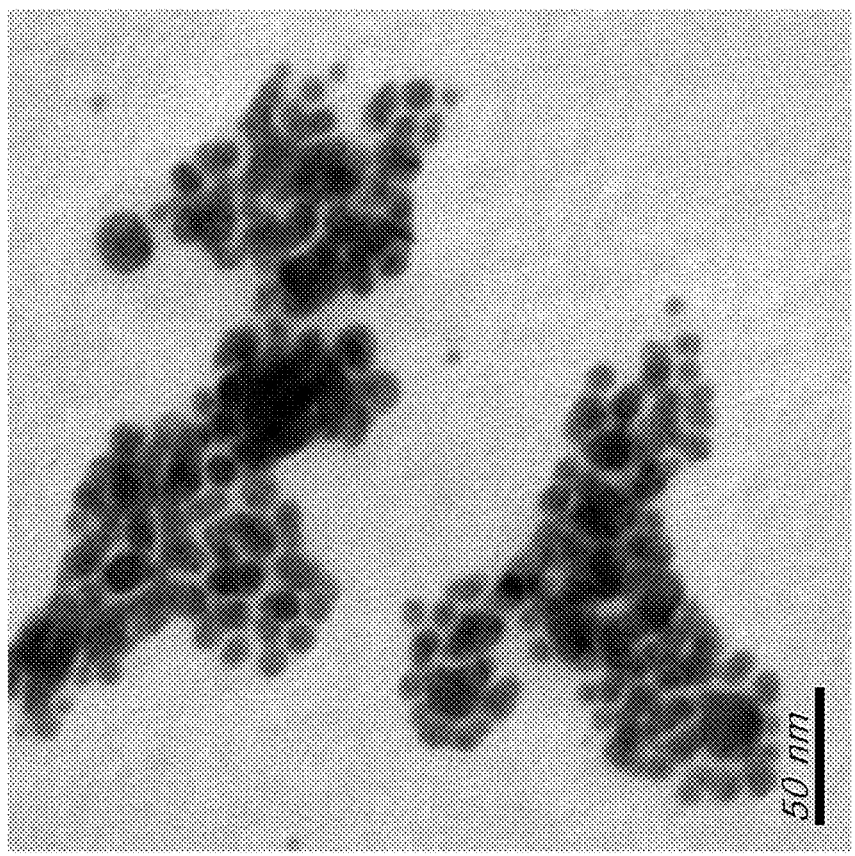
FIG. 26 is TEM image of colloidal silver nanoparticles (mean diameter of 10 nm-11 nm) obtained in Example 58.

Finally, in step (c), an aqueous solution (50 mL) of citric acid (33.6 mg, 0.17 mmol) and NaOH (46.5 mg, 1.12 mmol) was used as a medium to disperse the silver nanoparticles in the flat-bottomed flask, and said solution was heated at 70° C. for 15 minutes to obtain colloidal silver nanoparticles, which showed the UV-Vis absorption band at λmax=390 nm with OD=2.882 as in FIG. 25 (measured at 50% dilution). The mean diameter of colloidal silver nanoparticles was 10 nm toll nm as shown by TEM image in FIG. 26.

Example 59 Synthesis of Colloidal Silver Nanoparticles Using Ethyl Lactate and Citric Acid as Combined Reducing Agent First, in step (a), silver nitrate (0.1 mL of 0.1 M aqueous solution, 0.01 mmol) and citric acid (45.9 mg, 0.24 mmol) and ethyl lactate (11.7 mg, 0.10 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing silver nanoparticles, residues and $NO_2$ gas; the amount of the residues was almost 0% by volume of the mixture solution. At the same time, $NO_2$ gas produced from the reduction reaction was through the recovery port attached to the flat-bottomed flask and was trapped with 10 mL water in an Erlenmeyer flask for collection.

Figure 27:
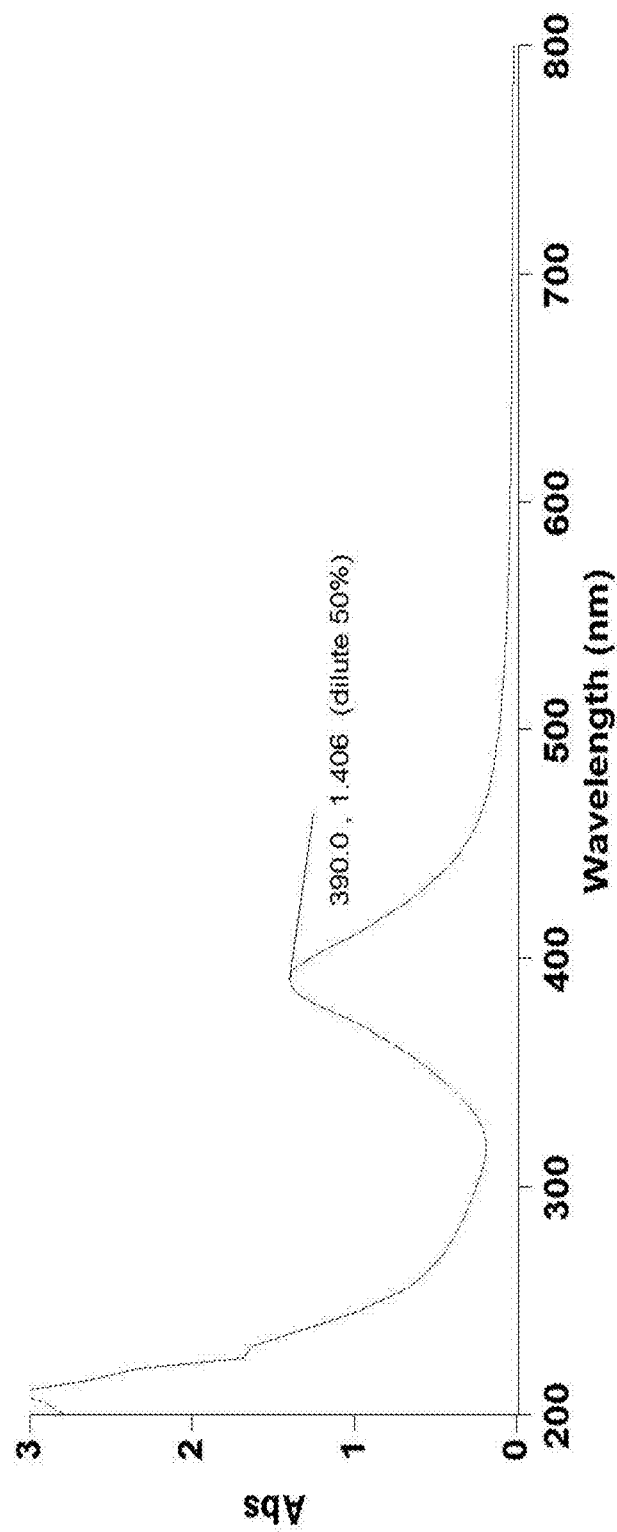
FIG. 27 is a UV-Vis spectrum of colloidal silver nanoparticles obtained in Example 59.

Finally, in step (c), an aqueous solution (50 mL) of citric acid (33.6 mg, 0.17 mmol) and NaOH (46.5 mg, 1.12 mmol) was used as a medium to disperse the silver nanoparticles in the flat-bottomed flask, and said solution was heated at 70° C. for 15 minutes to obtain colloidal silver nanoparticles, which showed the UV-Vis absorption band at λmax=390 nm with OD=2.812 as in FIG. 27 (measured at 50% dilution).

Example 60 Synthesis of Colloidal Silver Nanoparticles Using Lactic Acid and Citric Acid as Combined Reducing Agent First, in step (a), silver nitrate (0.1 mL of 0.1 M aqueous solution, 0.01 mmol) and citric acid (45.4 mg, 0.24 mmol) and lactic acid (10.3 mg, 0.11 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing silver nanoparticles, residues and $NO_2$ gas; the amount of the residues was almost 0% by volume of the mixture solution. At the same time, $NO_2$ gas produced from the reduction reaction was through the recovery port attached to the flat-bottomed flask and was trapped with 10 mL water in an Erlenmeyer flask for collection.

Figure 28:
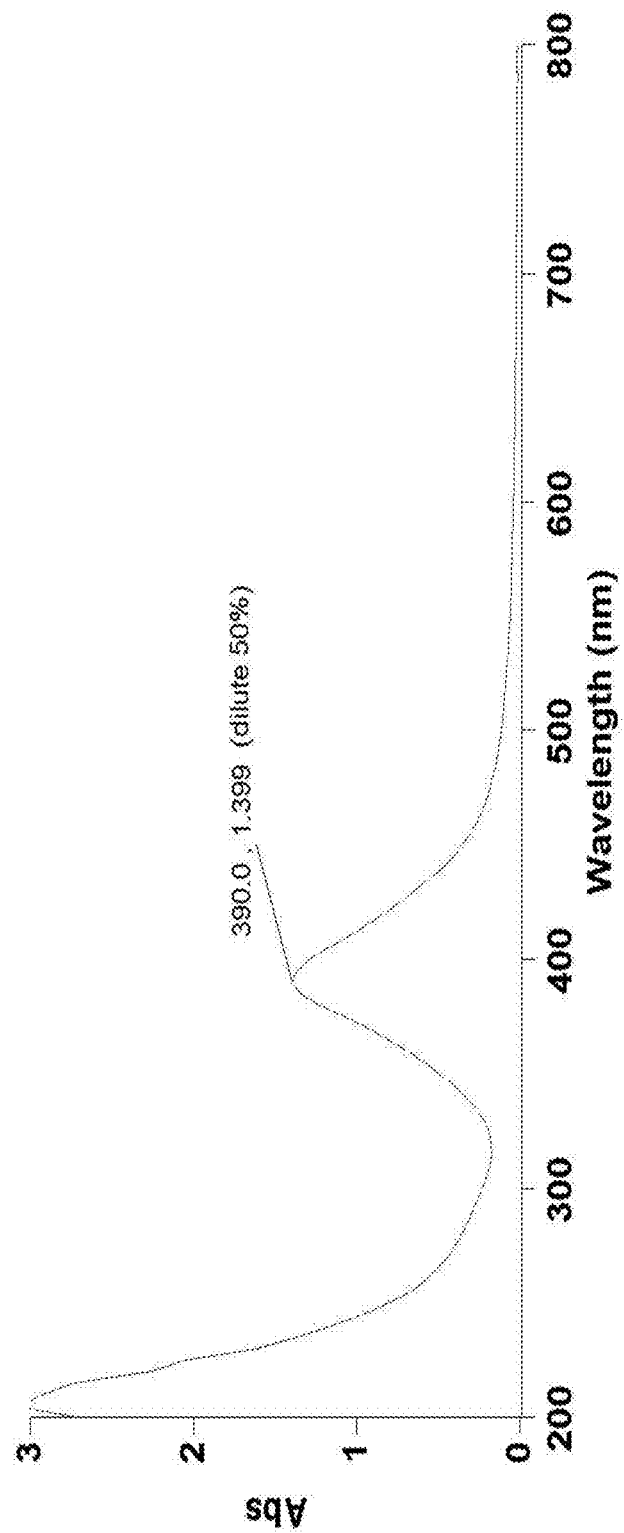
FIG. 28 is a UV-Vis spectrum of colloidal silver nanoparticles obtained in Example 60.

Finally, in step (c), an aqueous solution (50 mL) of citric acid (33.6 mg, 0.17 mmol) and NaOH (46.5 mg, 1.12 mmol) was used as a medium to disperse the silver nanoparticles in the flat-bottomed flask, and said solution was heated at 70° C. for 15 minutes to obtain colloidal silver nanoparticles, which showed the UV-Vis absorption band at λmax=390 nm with OD=2.798 as in FIG. 28 (measured at 50% dilution).

Example 61 Synthesis of Colloidal Silver Nanoparticles Using Citric Acid as Reducing and Dispersing Agent First, in step (a), silver nitrate (0.1 mL of 0.1 M aqueous solution, 0.01 mmol) and citric acid (45.1 mg, 0.23 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing silver nanoparticles, residues and $NO_2$ gas; the amount of the residues was almost 0% by volume of the mixture solution. At the same time, $NO_2$ gas produced from the reduction reaction was through the recovery port attached to the flat-bottomed flask and was trapped with 10 mL water in an Erlenmeyer flask for collection.

Figure 29:
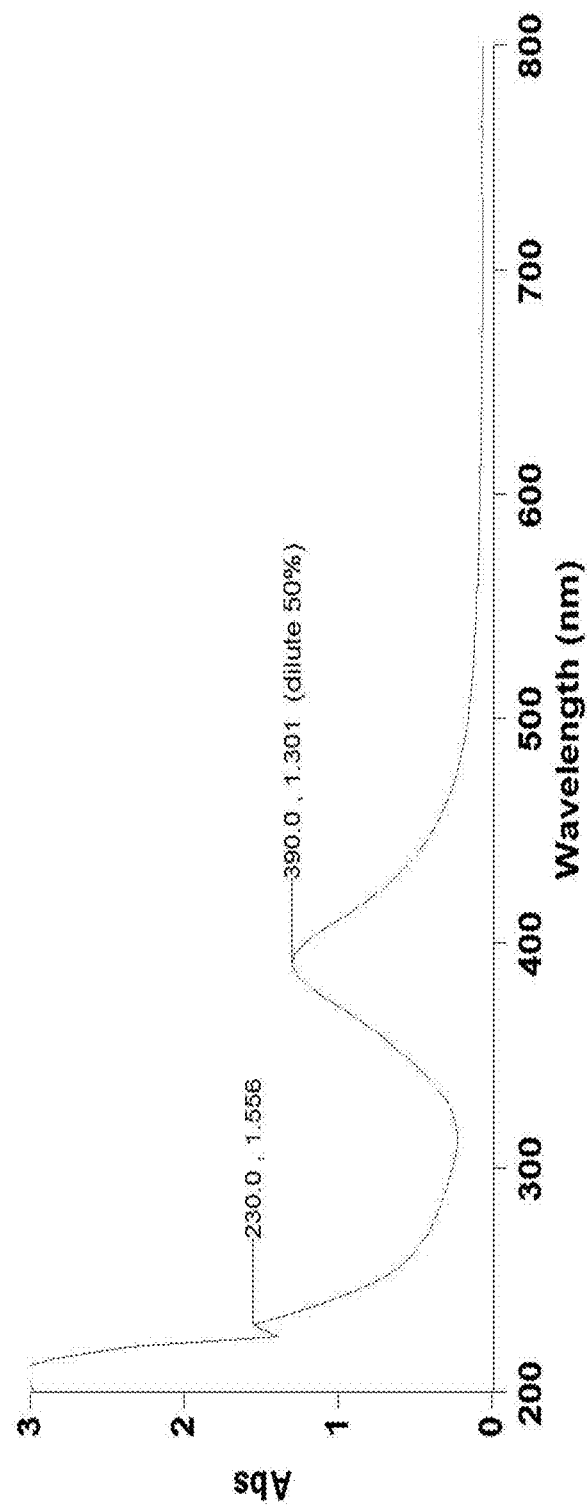
FIG. 29 is a UV-Vis spectrum of colloidal silver nanoparticles obtained in Example 61.

Finally, in step (c), an aqueous solution (50 mL) of citric acid (33.6 mg, 0.17 mmol) and NaOH (46.5 mg, 1.12 mmol) was used as a medium to disperse the silver nanoparticles in the flat-bottomed flask, and said solution was heated at 70° C. for 10 minutes to obtain colloidal silver nanoparticles, which showed the UV-Vis absorption band at λmax=390 nm with OD=2.602 as shown in FIG. 29 (measured at 50% dilution).

Example 62 Synthesis of Colloidal Palladium Nanoparticles Using Ethyl Lactate as Reducing Agent First, in step (a), palladium chloride (0.1 mL of 0.1 M aqueous solution, 0.01 mmol) and ethyl lactate (27.8 mg, 0.24 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing palladium nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (33.6 mg, 0.17 mmol) was used as a medium to disperse the palladium nanoparticles in the flat-bottomed flask, and said solution was heated at 70° C. for 30 minutes to obtain colloidal palladium nanoparticles.

Example 63 Synthesis of Colloidal Palladium Nanoparticles Using γ-Butyrolactone as Reducing Agent First, in step (a), palladium chloride (0.1 mL of 0.1 M aqueous solution, 0.01 mmol) and γ-butyrolactone (20.3 mg, 0.24 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing palladium nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (33.6 mg, 0.17 mmol) was used as a medium to disperse the palladium nanoparticles in the flat-bottomed flask, and said solution was heated at 70° C. for 30 minutes to obtain colloidal palladium nanoparticles.

Example 64 Synthesis of Colloidal Palladium Nanoparticles Using Methyl Lactate and Citric Acid as Combined Reducing Agent First, in step (a), palladium chloride (0.1 mL of 0.1 M aqueous solution, 0.01 mmol) and citric acid (45.7 mg, 0.24 mmol) and methyl lactate (11.7 mg, 0.11 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing palladium nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (33.6 mg, 0.17 mmol) was used as a medium to disperse the palladium nanoparticles in the flat-bottomed flask, and said solution was heated at 70° C. for 30 minutes to obtain colloidal palladium nanoparticles.

Example 65 Synthesis of Colloidal Palladium Nanoparticles Using Ethyl Lactate and Citric Acid as Combined Reducing Agent First, in step (a), palladium chloride (0.1 mL of 0.1 M aqueous solution, 0.01 mmol) and citric acid (45.4 mg, 0.24 mmol) and ethyl lactate (11.9 mg, 0.10 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing palladium nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 30:
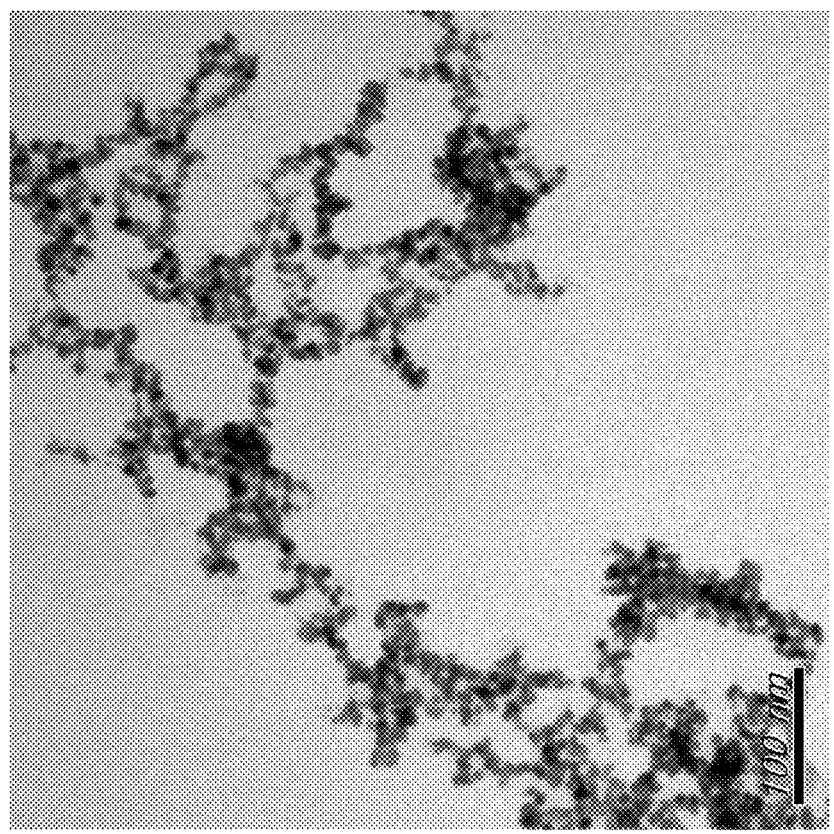
FIG. 30 is TEM image of colloidal palladium nanoparticles (mean diameter of 9 nm to 10 nm) obtained in Example 65.

Finally, in step (c), an aqueous solution (50 mL) of citric acid (33.6 mg, 0.17 mmol) was used as a medium to disperse the palladium nanoparticles in the flat-bottomed flask, and said solution was heated at 70° C. for 30 minutes to obtain colloidal palladium nanoparticles. The mean diameter of colloidal palladium nanoparticles was 9 nm to 10 nm as shown by TEM image in FIG. 30.

Example 66 Synthesis of Colloidal Palladium Nanoparticles Using Lactic Acid and Citric Acid as Combined Reducing Agent First, in step (a), palladium chloride (0.1 mL of 0.1 M aqueous solution, 0.01 mmol) and citric acid (45.7 mg, 0.24 mmol) and lactic acid (10.8 mg, 0.12 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing palladium nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (33.6 mg, 0.17 mmol) was used as a medium to disperse the palladium nanoparticles in the flat-bottomed flask, and said solution was heated at 70° C. for 30 minutes to obtain colloidal palladium nanoparticles.

Example 67 Synthesis of Colloidal Palladium Nanoparticles Using Citric Acid as Reducing and Dispersing Agent First, in step (a), palladium chloride (0.1 mL of 0.1 M aqueous solution, 0.01 mmol) and citric acid (45.2 mg, 0.23 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing palladium nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (33.6 mg, 0.17 mmol) was used as a medium to disperse the palladium nanoparticles in the flat-bottomed flask, and said solution was heated at 70° C. for 30 minutes to obtain colloidal palladium nanoparticles.

Example 68 Synthesis of Colloidal Zinc Nanoparticles Using Poly(Lactic Acid) as Reducing Agent First, in step (a), zinc chloride (0.1 mL of 2 M aqueous solution, 0.2 mmol) and poly(lactic acid) (106.5 mg) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing zinc nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (33.6 mg, 0.17 mmol) was used as a medium to disperse the zinc nanoparticles in the flat-bottomed flask, and said solution was heated at 70° C. for 30 minutes to obtain colloidal zinc nanoparticles.

Example 69 Synthesis of Colloidal Zinc Nanoparticles Using Methyl Lactate and Citric Acid as Combined Reducing Agent First, in step (a), zinc chloride (0.1 mL of 2 M aqueous solution, 0.2 mmol) and citric acid (45.9 mg, 0.24 mmol) and methyl lactate (10.4 mg, 0.10 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing zinc nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (33.6 mg, 0.17 mmol) was used as a medium to disperse the zinc nanoparticles in the flat-bottomed flask, and said solution was heated at 70° C. for 30 minutes to obtain colloidal zinc nanoparticles.

Example 70 Synthesis of Colloidal Zinc Nanoparticles Using Ethyl Lactate and Citric Acid as Combined Reducing Agent First, in step (a), zinc chloride (0.1 mL of 2 M aqueous solution, 0.2 mmol) and citric acid (45.9 mg, 0.24 mmol) and ethyl lactate (11.4 mg, 0.10 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing zinc nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (33.6 mg, 0.17 mmol) was used as a medium to disperse the zinc nanoparticles in the flat-bottomed flask, and said solution was heated at 70° C. for 30 minutes to obtain colloidal zinc nanoparticles.

Example 71 Synthesis of Colloidal Zinc Nanoparticles Using Lactic Acid and Citric Acid as Combined Reducing Agent First, in step (a), zinc chloride (0.1 mL of 2 M aqueous solution, 0.2 mmol) and citric acid (45.9 mg, 0.24 mmol) and lactic acid (10.2 mg, 0.11 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing zinc nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Figure 31:
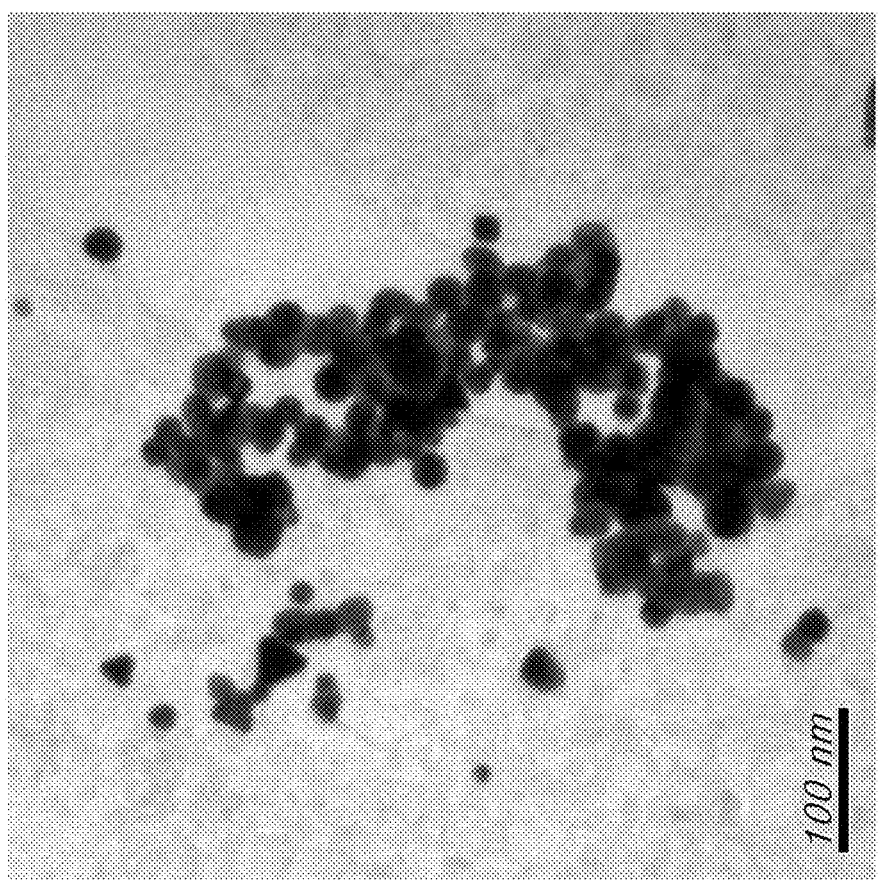
FIG. 31 is TEM image of colloidal zinc nanoparticles (mean diameter of 26 nm to 27 nm) obtained in Example 71.

Finally, in step (c), an aqueous solution (50 mL) of citric acid (33.6 mg, 0.17 mmol) was used as a medium to disperse the zinc nanoparticles in the flat-bottomed flask, and said solution was heated at 70° C. for 30 minutes to obtain colloidal zinc nanoparticles. The mean diameter of colloidal zinc nanoparticles was 26 nm to 27 nm as shown by TEM image in FIG. 31.

Example 72 Synthesis of Colloidal Zinc Nanoparticles Using Citric Acid as Reducing and Dispersing Agent First, in step (a), zinc chloride (0.1 mL of 2 M aqueous solution, 0.2 mmol) and citric acid (45.9 mg, 0.24 mmol) were added via an inlet port into a double-necked flat-bottomed 100 mL reaction flask and were mixed to form a mixture solution.

Subsequently, in step (b), the flat-bottomed flask was placed on a hot plate and heated at 150° C. for 12 minutes to perform a reduction reaction which was monitored by the IR spectrometer. The reduction reaction produced a composition containing zinc nanoparticles, residues and HCl gas; the amount of the residues was almost 0% by volume of the mixture solution. At the same time, HCl gas produced from the reduction reaction was through the recovery port attached to the flat-bottomed flask and was trapped with 10 mL water in an Erlenmeyer flask for collection.

Finally, in step (c), an aqueous solution (50 mL) of citric acid (33.6 mg, 0.17 mmol) was used as a medium to disperse the zinc nanoparticles in the flat-bottomed flask, and said solution was heated at 70° C. for 30 minutes to obtain colloidal zinc nanoparticles.

Discussion of the Results

Based on the results of Examples 1 to 56, the instant process employs aqueous Tetrachloroauric acid solution as metal source and varies different kinds of reducing agents to form gold nanoparticles, and then uses diverse kinds of medium to disperse said gold nanoparticles to obtain colloidal gold nanoparticles.

From the results of Examples 57 to 61, the instant process employs aqueous silver nitrate solution as metal source and varies different kinds of reducing agents to form silver nanoparticles, and then uses diverse kinds of medium to disperse said silver nanoparticles to obtain colloidal silver nanoparticles.

From the results of Examples 62 to 67, the instant process employs aqueous palladium chloride solution as metal source and varies different kinds of reducing agents to form palladium nanoparticles, and then uses diverse kinds of medium to disperse said palladium nanoparticles to obtain colloidal palladium nanoparticles.

From the results of Examples 68 to 72, the instant process employs aqueous zinc chloride solution as metal source and varies different kinds of reducing agents to form zinc nanoparticles, and then using diverse kinds of medium to disperse said zinc nanoparticles to obtain colloidal zinc nanoparticles.

Further, Examples 1 to 34, Example 57 to 59, Example 62 to 65, and Example 68 to 70 use non-toxic and biocompatible reducing agents of esters including methyl lactate, ethyl lactate, γ-butyrolactone or poly(lactic acid). It is more eco-friendly and suitable to be applied in the present society.

From the comparison results of Examples 1 and 2, selection of different dispersing media for the metal nanoparticles to make colloidal metal nanoparticles in various sizes is determined from the different λmax. Similarly, from the comparison results of Examples 14 and 15, they also have colloidal metal nanoparticles in different mean sizes. In addition, from the comparison results of Examples 2, 15 and 35, selection of different reducing agents to form the metal nanoparticles in various sizes is determined from the different λmax. As the method is processed and separated by two steps rather than in one pot reaction, it can have wider range of options to choose suitable reducing agents and dispersing medium. Accordingly, it is more convenient to apply in various industrial and medical applications.

Compared with the conventional process, the concentration of metal ions is relatively high in Examples 1 to 72 because of the low water content in the reduction reaction, and therefore the reaction time can be reduced for making metal nanoparticles within 80 minutes, in most examples even within 20 minutes, and the fastest is even merely 2 minutes. This is a cost-effective process, and faster reaction rate of reduction yields a narrower size distribution of metal nanoparticles. As a result, said metal nanoparticles in homogeneous size distribution do not require further filtration, so the yield can improve.

Unlike the conventional method that involves a hazardous process in adding a solution of metal ion rapidly to a boiling solution of reducing agent, the instant method by heating a pre-mixed solution of metal ions and reducing agents even in a large scale is a much safer manner. Moreover, the instant method proceeds in an easy and efficient manner by just using simple setup without complicate apparatus of reactor or stirring equipment apparatus.

What is more, using organic reducing and dispersing agents in water makes colloidal metal nanoparticles have good quality and stability without the interference of other inorganic cations.

Besides, according to the step (b) in the instant disclosure, heating and guiding the gas out of the reaction tank can convert the anions (e.g., $Cl^-$ and $NO_3^-$) to gas (e.g., HCl and $NO_2$) that is trapped by water for reuse. As most anions are removed from the colloidal metal nanoparticles, said colloidal metal nanoparticles have high stability and zeta potential without appreciable interference of anions.

Even though numerous characteristics and advantages of the instant disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. A method of making colloidal metal nanoparticles, comprising steps of:
   step (a): mixing a metal aqueous solution and a reducing agent to form a mixture solution in a reaction tank;
   step (b): heating the mixture solution and undergoing a reduction reaction to produce a composition containing metal nanoparticles, residues and gas, wherein the amount of the residues is less than 20% by volume of the mixture solution, and guiding said gas out of the reaction tank;
   step (c): dispersing the metal nanoparticles with a medium to obtain colloidal metal nanoparticles.

2. The method as claimed in claim 1, wherein the metal aqueous solution contains metal ions, and the metal ions comprise gold ions, silver ions, copper ions, zinc ions, nickel ions, palladium ions, cobalt ions, iron ions, titanium ions, cadmium ions, platinum ions, aluminum ions, lead ions, manganese ions, chromium ions, molybdenum ions, vanadium ions, or tungsten ions.

3. The method as claimed in claim 2, wherein the metal aqueous solution contains anions, and the anions comprise halide ions or nitrate ions.

4. The method as claimed in claim 3, wherein the metal ions are from $HAuCl_4$, $AgNO_3$, $Cu(NO_3)_2$, $CuCl_2$, $ZnCl_2$, $NiCl_2$, $PdCl_2$, $CoCl_2$, $FeCl_2$, $FeCl_3$, $TiCl_2$, or $TiCl_4$.

5. The method as claimed in claim 1, wherein the step (b) of guiding the gas produced from the reduction reaction out of the reaction tank comprises trapping the gas with water in a tank.

6. The method as claimed in claim 1, wherein the temperature of the heating in the step (b) ranges from 50° C. to 150° C.

7. The method as claimed in claim 1, wherein the temperature of the heating in the step (b) ranges from 70° C. to 130° C.

8. The method as claimed in claim 1, wherein the temperature of the dispersing in the step (c) ranges from 20° C. to 100° C.

9. The method as claimed in claim 1, wherein the temperature of the dispersing in the step (c) ranges from 50° C. to 80° C.

10. The method as claimed in claim 1, wherein the reducing agent comprises at least one ester.

11. The method as claimed in claim 10, wherein the ester is selected from the group of a carboxylate ester, a cyclic ester, a polymeric ester, and combinations thereof.

12. The method as claimed in claim 11, wherein the carboxylate ester is represented by the formula (I),

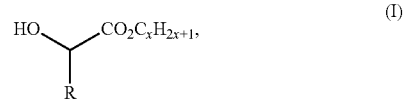

wherein R is H or $CH_3$, and x is an integer ranging from 1 to 16.

13. The method as claimed in claim 11, wherein the cyclic ester is represented by the formula (II),

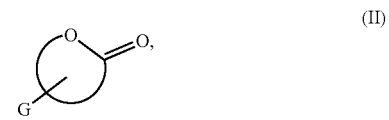

wherein the ring contains one oxygen atom and 4 to 6 carbon atoms, and G is H, $CH_3$ or $C_2H_5$.

14. The method as claimed in claim 11, wherein the polymeric ester is represented by the formula (III),

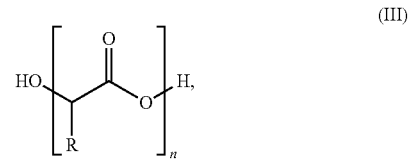

wherein R is H or $CH_3$, and n is an integer ranging from 2 to 1400.

15. The method as claimed in claim 1, wherein the reducing agent comprises a citric acid, a lactic acid, a glycolic acid, an ascorbic acid, an oxalic acid, a tartaric acid, a 1,4-butanediol, a glycerol, a poly(ethylene glycol), a hydroquinone, an acetaldehyde, a glucose, a cellulose, a carboxymethyl cellulose, a cyclodextrin, a chitin, a chitosan, or combinations thereof.

16. The method as claimed in claim 10, wherein the reducing agent comprises a citric acid, a lactic acid, a glycolic acid, an ascorbic acid, an oxalic acid, a tartaric acid, a 1,4-butanediol, a glycerol, a poly(ethylene glycol), a hydroquinone, an acetaldehyde, a glucose, a cellulose, a carboxymethyl cellulose, a cyclodextrin, a chitin, a chitosan, or combinations thereof.

17. The method as claimed in claim 11, wherein the reducing agent comprises a citric acid, a lactic acid, a glycolic acid, an ascorbic acid, an oxalic acid, a tartaric acid, a 1,4-butanediol, a glycerol, a poly(ethylene glycol), a hydroquinone, an acetaldehyde, a glucose, a cellulose, a carboxymethyl cellulose, a cyclodextrin, a chitin, a chitosan, or combinations thereof.

18. The method as claimed in claim 12, wherein the reducing agent comprises a citric acid, a lactic acid, a glycolic acid, an ascorbic acid, an oxalic acid, a tartaric acid, a 1,4-butanediol, a glycerol, a poly(ethylene glycol), a hydroquinone, an acetaldehyde, a glucose, a cellulose, a carboxymethyl cellulose, a cyclodextrin, a chitin, a chitosan, or combinations thereof.

19. The method as claimed in claim 13, wherein the reducing agent comprises a citric acid, a lactic acid, a glycolic acid, an ascorbic acid, an oxalic acid, a tartaric acid, a 1,4-butanediol, a glycerol, a poly(ethylene glycol), a hydroquinone, an acetaldehyde, a glucose, a cellulose, a carboxymethyl cellulose, a cyclodextrin, a chitin, a chitosan, or combinations thereof.

20. The method as claimed in claim 14, wherein the reducing agent comprises a citric acid, a lactic acid, a glycolic acid, an ascorbic acid, an oxalic acid, a tartaric acid, a 1,4-butanediol, a glycerol, a poly(ethylene glycol), a hydroquinone, an acetaldehyde, a glucose, a cellulose, a carboxymethyl cellulose, a cyclodextrin, a chitin, a chitosan, or combinations thereof.

21. The method as claimed in claim 2, wherein a molar concentration of the metal ions ranges from 0.1 M to 3.0 M.

22. The method as claimed in claim 21, wherein the reducing agent is selected from the group of a carboxylate ester, a cyclic ester, a citric acid, a lactic acid, a glycolic acid, an ascorbic acid, an oxalic acid, a tartaric acid, a 1,4-butanediol, a glycerol, a hydroquinone, an acetaldehyde, a glucose, a chitin, and combinations thereof, and a molar ratio of the reducing agent relative to the metal ions ranges from 1 to 40; wherein the reducing agent is a polymeric ester, and the weight of said polymeric ester ranges from 30 mg to 150 mg.

23. The method as claimed in claim 1, wherein the medium in step (c) comprises a dispersing agent with an aqueous citric acid, an aqueous lactic acid, an aqueous poly(lactic acid), an aqueous sodium hydroxide, an aqueous hexadecylamine, an aqueous oleylamine, an aqueous tetraoctylammonium bromide (TOAB), an aqueous dodecanethiol, an aqueous poly(ethylene oxide), an aqueous polyvinylpyrrolidone (PVP), or combinations thereof.

24. The method as claimed in claim 23, wherein a molar concentration of the dispersing agent ranges from 0.001 M to 0.1 M.

25. The method as claimed in claim 23, wherein a molar ratio of the dispersing agent relative to the metal nanoparticles ranges from 10 to 100.

26. The method as claimed in claim 23, wherein a molar ratio of the dispersing agent relative to the metal nanoparticles ranges from 15 to 30.

* * * * *